US010671243B2

(12) United States Patent
Ryu et al.

(10) Patent No.: US 10,671,243 B2
(45) Date of Patent: Jun. 2, 2020

(54) SCREEN OPERATING METHOD AND ELECTRONIC DEVICE SUPPORTING THE SAME

(71) Applicant: Samsung Electronics Co., Ltd., Suwon-si, Gyeonggi-do (KR)

(72) Inventors: Wan Sang Ryu, Suwon-si (KR); Young Soo Park, Suwon-si (KR); Gang Youl Yu, Suwon-si (KR); Yong Sang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 15/215,060

(22) Filed: Jul. 20, 2016

(65) Prior Publication Data
US 2017/0031542 A1 Feb. 2, 2017

(30) Foreign Application Priority Data
Jul. 27, 2015 (KR) .................. 10-2015-0105981

(51) Int. Cl.
*G06F 3/0482* (2013.01)
*G06F 21/34* (2013.01)
*G06F 3/0485* (2013.01)
*G06F 3/0488* (2013.01)
(Continued)

(52) U.S. Cl.
CPC .......... *G06F 3/0482* (2013.01); *G06F 3/0485* (2013.01); *G06F 3/0488* (2013.01); *G06F 3/04817* (2013.01); *G06F 3/04845* (2013.01); *G06F 3/04883* (2013.01); *G06F 3/04886* (2013.01); *G06F 21/34* (2013.01)

(58) Field of Classification Search
CPC .... G06F 21/34; G06F 3/04817; G06F 3/0482; G06F 3/04845; G06F 3/0485; G06F 3/0488; G06F 3/04883; G06F 3/048; G06F 3/04886
See application file for complete search history.

(56) References Cited

U.S. PATENT DOCUMENTS 9,086,731 B2  7/2015 Hisano et al.
2008/0163053 A1* 7/2008 Hwang ............... G06F 3/0482
                                                    715/702
(Continued)

FOREIGN PATENT DOCUMENTS

JP    2013-073529 A      4/2013
KR    10-2013-0137969 A  12/2013
KR    10-2015-0085054 A   7/2015

OTHER PUBLICATIONS

Amy K. Karlson and Benjamin B. Bederson, One-Handed Touch-screen Input for Legacy Applications, CHI 2008 Proceedings, ACM, pp. 1399-1408. (Year: 2008).*
(Continued)

*Primary Examiner* — Tan H Tran
(74) *Attorney, Agent, or Firm* — Jefferson IP Law, LLP

(57) ABSTRACT

An apparatus and method for screen operation are provided. The apparatus includes an electronic device. The electronic device includes a display on which one or more objects are displayed, and a processor for controlling a display state of the display. The processor adjusts, based on a location indicated by a received input event, a display location of the one or more objects displayed on the display.

13 Claims, 17 Drawing Sheets

(51) Int. Cl.
*G06F 3/0481* (2013.01)
*G06F 3/0484* (2013.01)

(56) References Cited

U.S. PATENT DOCUMENTS

| | | | | |
|---|---|---|---|---|
| 2010/0122194 | A1* | 5/2010 | Rogers | G06F 3/04817 715/769 |
| 2010/0306650 | A1* | 12/2010 | Oh | G06F 3/0482 715/702 |
| 2013/0135234 | A1 | 5/2013 | Hisano et al. | |
| 2013/0139102 | A1 | 5/2013 | Miura et al. | |
| 2014/0013255 | A1* | 1/2014 | Fukuoka | G06F 3/0484 715/765 |
| 2014/0092039 | A1* | 4/2014 | Ito | G06F 21/36 345/173 |
| 2014/0218372 | A1* | 8/2014 | Missig | G06F 3/044 345/473 |
| 2014/0362119 | A1* | 12/2014 | Freund | G06F 3/017 345/661 |
| 2014/0380209 | A1 | 12/2014 | Tsukamoto | |
| 2015/0205507 | A1 | 7/2015 | Chen | |
| 2015/0253955 | A1* | 9/2015 | Chiba | G06F 3/04883 345/173 |
| 2015/0268811 | A1* | 9/2015 | Min | G06F 3/0488 715/765 |
| 2015/0370448 | A1 | 12/2015 | Hisano et al. | |
| 2016/0179278 | A1* | 6/2016 | Kim | G06F 21/36 345/174 |
| 2016/0210012 | A1 | 7/2016 | Han et al. | |
| 2016/0349985 | A1* | 12/2016 | Ibaraki | G06F 3/04883 |
| 2017/0199662 | A1* | 7/2017 | Xia | G06F 3/04883 |
| 2017/0220309 | A1* | 8/2017 | Kato | G06F 1/1641 |
| 2017/0364196 | A1* | 12/2017 | Wu | G06F 3/0416 |

OTHER PUBLICATIONS

Mike Tanasychuk, How to turn on Reachability on iPhone, https://www.imore.com/how-use-reachability-iphone, Oct. 7, 2014. (Year: 2014).*

* cited by examiner

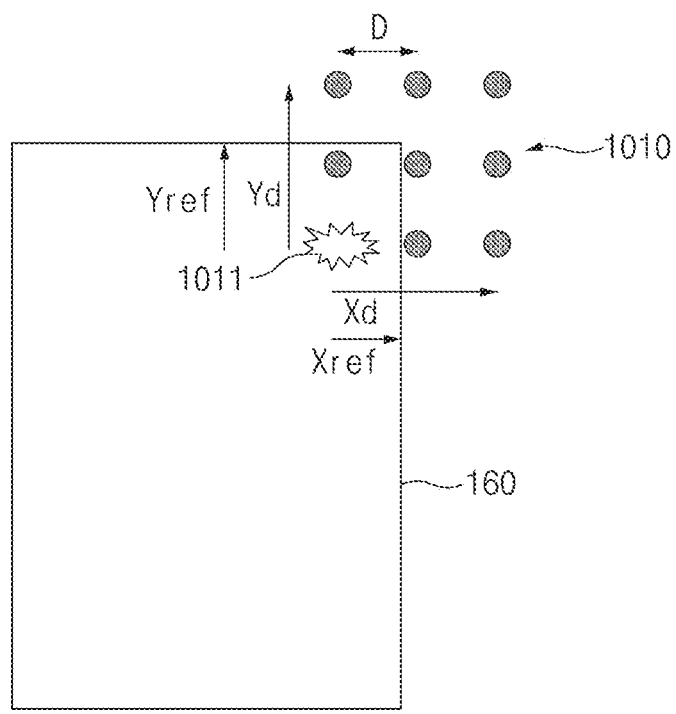
F I G. 10A

SCREEN OPERATING METHOD AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Jul. 27, 2015 in the Korean Intellectual Property Office and assigned Serial number 10-2015-0105981, the entire disclosure of which is hereby incorporated by reference.

TECHNICAL FIELD

The present disclosure relates to screen control according to a user input.

BACKGROUND

Electronic devices support various user functions. In relation to various user functions, electronic devices can provide screens including one or more objects. The display sizes of the screens in the electronic device are being increased so that a larger amount of information can be displayed.

Therefore, typical electronic devices may cause users to experience inconvenience when holding such electronic devices and performing touch operations simultaneously with only one hand. For example, it may be very difficult for a user to touch the entire area of a display of an electronic device while holding the electronic device with one hand. Furthermore, since a large-screen display generally requires a large touch motion, it is highly inconvenient to touch a screen while holding the electronic device with one hand.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a screen operating method for facilitating a screen operation by readjusting a screen in response to a user input and an electronic device supporting the same.

In accordance with an aspect of the present disclosure, an electronic device is provided. The electronic device includes a display on which one or more objects is/are displayed and a processor for controlling a display state of the display, wherein the processor adjusts, based on a location indicated by a received input event, a display location of the one or more objects displayed on the display to display the one or more objects.

In accordance with another aspect of the present disclosure, a screen operating method is provided. The screen operating method includes displaying one or more objects, receiving an input event, and displaying the one or more objects by adjusting a display location of the one or more objects displayed on a display based on a location indicated by the input event.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10A is a diagram illustrating a state prior to a lock pattern display according to an embodiment of the present disclosure;

Throughout the drawings, like reference numerals will be understood to refer to like parts, components, and structures.

DETAILED DESCRIPTION

Figure 1:
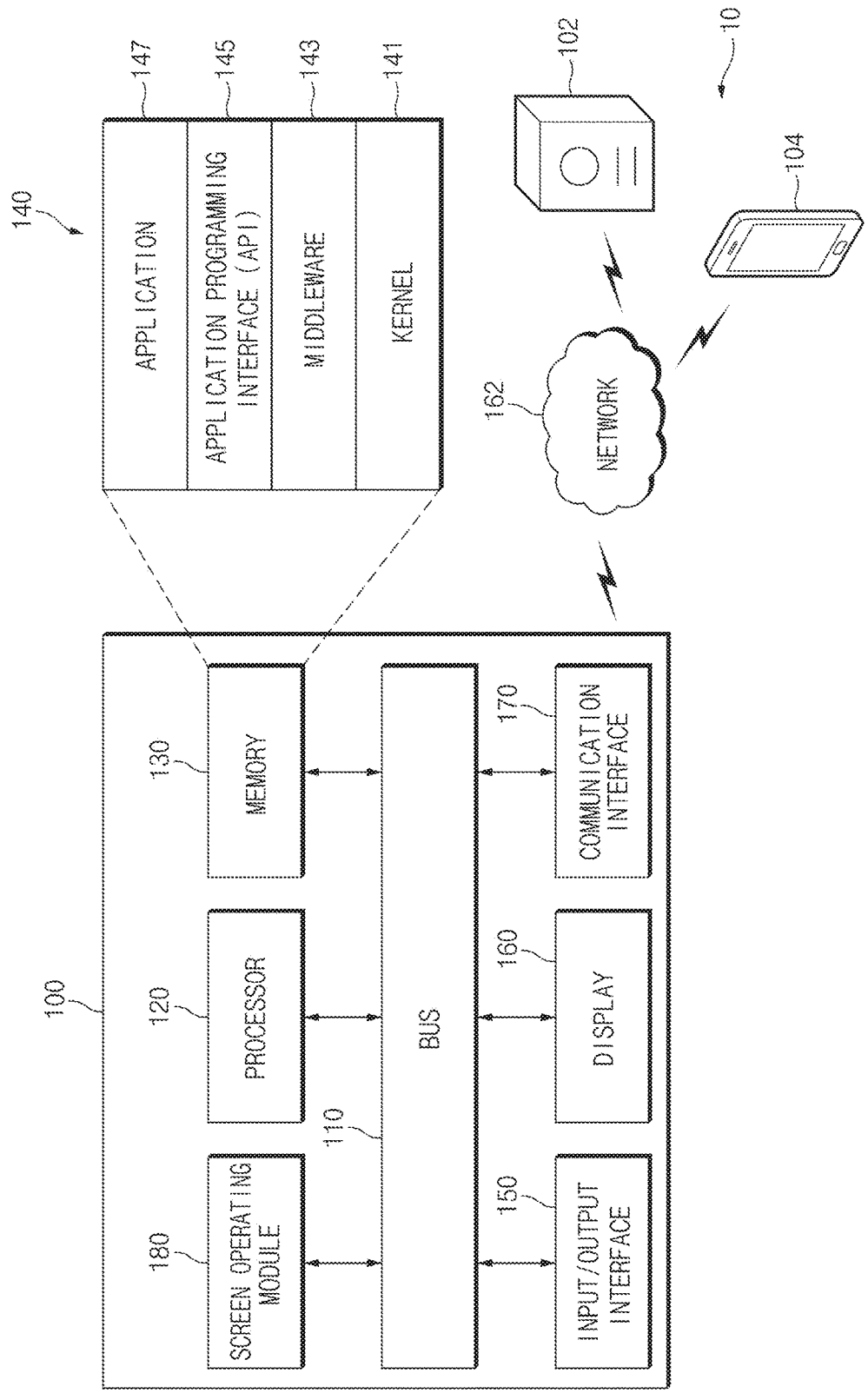
FIG. 1 is a diagram illustrating an electronic device operating environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "have", "may have", "include", "may include", "comprise", or the like used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second", or the like used herein may modify various elements regardless of the order and/or priority thereof, and is used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" used herein may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

Terms defined in general dictionaries, among the terms used herein, may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera, or a wearable device. According to various embodiments of the present disclosure, the wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In various embodiments of the present disclosure, an electronic device may be a home appliance. The home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments of the present disclosure, an electronic device may include at least one of various medical devices including various portable medical measurement devices. The various portable medical measurement devices may include a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices.

An electronic device according to various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an electronic device operating environment according to an embodiment of the present disclosure.

Referring to FIG. 1, an electronic device operating environment 10 may include, for example, an electronic device 100, a network 162, a server 102, and/or an external electronic device 104.

In the electronic device operating environment 10, if a user input occurs after the electronic device 100 outputs a screen in response to an execution of a specified application, a display state of a screen element may be readjusted. Such readjustment may include a screen size being readjusted, a display state of one or more objects included in a screen being readjusted, and/or a display state of at least a part of an entire screen providable by a specified application being readjusted, based on an occurrence point of the user input.

According to various embodiments of the present disclosure, if a specified input event (e.g., an event of releasing the user input) occurs, the electronic device 100 may display a display-state-adjusted screen based on an occurrence point of the specified input event. Alternatively, if a specified input event occurs, the electronic device 100 may perform a function related to an icon specified by the input event, and may output a screen in response to an execution of the function. Alternatively, the electronic device 100 may apply a user input (e.g., a touchdown event, a touch and drag event, or a touch release event), which is input in a state in which a display state of a screen element is readjusted, as an input event of a specific application, and may perform a function according to an application of the input event.

According to various embodiments of the present disclosure, the electronic device 100 may output a lock pattern related to a lock release as a screen element, and may readjust a display state of the screen element in response to a user input (e.g., a touchdown event). For example, the electronic device 100 may readjust the display state of the lock pattern based on a point of a touchdown which has occurred on a specific object (or an adjacent location to the specific object) among a plurality of objects included in the lock pattern. According to an embodiment of the present disclosure, the electronic device 100 may perform, based on the touchdown point, at least one of a location movement of the objects included in the lock pattern, a reduction of a distance between the objects, or a size reduction of the objects. If the touchdown point is output to an area outside the lock pattern, the electronic device 100 may perform, based on the touchdown point, at least one of a display location change of the lock pattern, a reduction of a distance between the objects, or a size reduction of the objects.

According to various embodiments of the present disclosure, if a user input (e.g., a touchdown event) occurs on an area outside the lock pattern, the electronic device 100 may output, to an occurrence point of the user input, a portion of the objects of a release pattern related to the lock pattern. For example, the electronic device 100 may output, to an occurrence point of a touch, an object for releasing the lock pattern. Alternatively, the electronic device 100 may reduce the size of the objects of the lock pattern or the distance between the objects of the lock pattern, while positioning, at the touch point, a start object related to a release among the objects of the lock pattern and rearranging the other objects of the lock pattern based on the start object. According to various embodiments of the present disclosure, the electronic device 100 may change at least one of an interval between objects or a size of the objects when the objects are reduced, according to a location of a user input on a display.

According to various embodiments of the present disclosure, the electronic device 100 may output one or more objects (e.g., an icon, a widget, or the like) as a screen element, and may receive a specified user input (e.g., a touchdown event or a long-press event). The electronic device 100 may reduce the size of the icons or the distance between the icons based on an occurrence point of a specified user input. According to an embodiment of the present disclosure, when readjusting a display state of a screen element, the electronic device 100 may output, to a certain location, at least one function icon (e.g., an icon deleting icon, or the like) related to an execution of a specified function in relation to the screen element.

According to various embodiments of the present disclosure, the electronic device 100 may receive a web page from the server 102, output the web page, and reduce and display the output web page, based on a user input point (e.g., a touchdown event point). In this operation, the electronic device 100 may reduce and display, on the display 160, a part (a part including a larger area than that of a currently displayed screen) or an entirety of a page (or a non-displayed page) displayable by a web page display function (e.g., a web browsing function). The electronic device 100 may perform movement of the page in response to an input event (e.g., a drag event) that occurs thereafter. The electronic device 100 may perform a function related to a displayed application in response to an input event (e.g., a touch release event) that occurs thereafter, or may output, to a full screen of the display 160, a partial display area related to an input event occurrence point (e.g., a touch release event point). According to an embodiment of the present disclosure, the electronic device 100 may enable a user to easily check, move, or select various pages while performing a touch operation with one hand.

According to various embodiments of the present disclosure, the electronic device 100 may differentiate output areas of screen elements to be output according to the number of user inputs (e.g., a plurality of touchdown events or a plurality of long-press events or a plurality of short-press events) that occur. For example, the electronic device 100 may output specified objects to respective user input points, and may collect input events related to the objects. The electronic device 100 may perform specific functions (e.g., a lock function) by applying the input events related to the objects as input signals of specified applications.

The network 162 may support establishment of a wired communication channel or a wireless communication channel among the electronic device 100, the external electronic device 104, and the server 102. In the case where the external electronic device 104 includes a wireless communication interface, the network 162 may support an establishment of a wireless communication channel of the external electronic device 104. The network 162 may include at least one device capable of supporting a wireless communication function (e.g., various wireless communication standards such as $2^{nd}$ generation (2G), $3^{rd}$ generation (3G), 4th generation (4G), long-term evolution (LTE), 5th generation (5G), etc.), and a wireless access communication function (e.g., a Wi-Fi communication function), and the like. The network 162 may include at least one of various telecommunications networks, including a computer network (e.g., a local area network (LAN) or wide area network (WAN)), the Internet, or a telephone network. The network 162 may also include a short-range communication network. In this case, data may be transmitted/received based on a short-range communication channel between the electronic device 100 and the server 102, between the electronic device 100 and the external electronic device 104, or between the server 102 and the external electronic device 104.

The server 102 may be connected to the electronic device 100 via the network 162. The server 102 may establish a wireless communication channel in response to a request from the electronic device 100. The server 102, for example, may receive specific data from the electronic device 100. Furthermore, the server 102 may transmit specific data (e.g., a web page) to the electronic device 100. A web page provided from the server 102 to the electronic device 100 may provide one page of an area displayable on the display 160 of the electronic device 100 and other pages connected to upper, lower, left, and right sides of the page. The other pages not displayed on the display 160 may be displayed on the display 160 in response to a user input (e.g., a swipe event or a drag event). At least a portion of the other pages may be reduced and displayed on the display 160 in response to a user input.

The external electronic device 104 may include various elements, with at least a portion of which being the same as or similar to the elements of the electronic device 100. According to an embodiment of the present disclosure, the external electronic device 104 may establish a voice or data communication channel to the electronic device 100. While the external electronic device 104 establishes a voice call channel to the electronic device 100, a voice call screen may be displayed on the electronic device 100. If a specified input event (e.g., a long-press event, short-press event, an event of applying a specified pressure, or the like) occurs on the display 160, the electronic device 100 may output, when outputting a reduced screen of the voice call screen based on an occurrence point of the input event, another screen to display information (e.g., phonebook information registered in relation to the external electronic device 104, call log information about the external electronic device 104, recent instant message screen information about the external electronic device 104, etc.) related to the external electronic device 104 to an area adjacent to the reduced screen.

Although a specified input event is described as a long-press event in the above description, various embodiments of the present disclosure are not limited thereto. For example, the specified input event may be an event for specifying a certain point on the display 160. For example, the specified input event may include a tap event in which a certain point on the display 160 is tapped, a hovering event in which an object spaced apart by a certain distance from a surface of the display 160 is recognized, etc. According to various embodiments of the present disclosure, the specified input event may include a gesture event (e.g., an event of indicating a certain point on the display in the state in which a camera shoots an image) for indicating a certain point on the display 160. According to various embodiments of the present disclosure, the specified input event may include a voice input event (e.g., audio information for indicating a lower right side of the display 160, audio information for indicating one object name displayed on the display 160, etc.) for indicating a certain point on the display 160. According to various embodiments of the present disclosure, the specified input event may include a sensor event (or sensing information) in which a pressure applied from the outside is sensed. In relation to this operation, the electronic device 100 may include at least one pressure sensor.

The electronic device 100 may include a bus 110, a processor 120, a memory 130, an input/output interface 150, a display 160, a communication interface 170, and a screen operating module 180.

The bus 110 may include a circuit for connecting the above-mentioned elements (120, 130, 150, 160, 170, and 180) to each other and transferring communications (e.g., control messages and/or data) among the above-mentioned elements. For example, the bus 110 may connect the communication interface 170 to the screen operating module 180. The bus 110 may transfer, to the external electronic device 104 (or the server 102) (the following description being provided with respect to the external electronic device 104), an application registration information generated by the screen operating module 180 via the communication interface 170.

The processor 120 may include at least one of a central processing unit (CPU), an application processor (AP), or a communication processor (CP). The processor 120 may perform data processing or an operation related to communication and/or control of at least one of the other elements of the electronic device 100. According to an embodiment of the present disclosure, the processor 120 may install at least one application according to a user input or a specified schedule. The processor 120 may perform signal processing required for adjusting a display state of one or more objects displayed on the display 160 or at least a part of a screen displayed thereon, based on an occurrence point of an input event input through the display 160 that supports a touch function. In relation to this operation, the processor 120 may include at least a part of the screen operating module 180, or at least one processor 120 may constitute at least a part of the screen operating module 180.

The memory 130 may include a volatile memory and/or a nonvolatile memory. The memory 130 may store instructions or data related to at least one of the other elements of the electronic device 100. The instructions may be executed by at least one of the processor 120 or the screen operating module 180. The instructions may include, for example, instructions for collecting a location value of an occurrence point of an input event and instructions for adjusting, based on the occurrence point of the input event, at least one of the size or location of the one or more objects displayed on the display 160. The instructions may include instructions for outputting an object related to execution of a specified function to a certain location based on the occurrence point of the input event. The instructions may include instructions for handling a function corresponding to an event that additionally occurs on a screen in which the display state of the object is adjusted.

According to various embodiments of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the screen operating module 180, or the memory 130) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 100 in order to control or manage the system resources.

The middleware 143 may serve as an intermediary so that the API 145 or the application program 147 communicates and exchanges data with the kernel 141. Furthermore, the middleware 143 may handle one or more task requests received from the application program 147 according to a priority order. For example, the middleware 143 may assign priority to at least one application program 147 for using the system resources (e.g., the bus 110, the processor 120, the screen operating module 180, the memory 130, or the like) of the electronic device 100. For example, the middleware 143 may handle one or more task requests according to the priority assigned to the at least one application program 147, thereby performing scheduling or load balancing with respect to one or more task requests.

The API 145 may include an interface for allowing the application program 147 to control functions provided from the kernel 141 or the middleware 143. The API 145 may include, for example, at least one interface or function (e.g., an instruction) for the purpose of file control, window control, image processing, character control, or the like.

The application program 147 may include at least one application. For example, the application program 147 may include a music application, an exercise (or healthcare) application, an alarm application, etc. According to an embodiment of the present disclosure, the application program 147 may include an application for adjusting a screen in response to a touch input. The screen adjusting application may be configured with at least one program routine or instruction so as to be included in another application (e.g., a standby screen or home screen output application, a lock screen application, or the like).

The input/output interface 150 may serve to transfer an instruction or data input from a user or another external device to other element(s) of the electronic device 100. Furthermore, the input/output interface 150 may output instructions or data received from other element(s) of the electronic device 100 to the user or another external device. The input/output interface 150 may include, for example, at least one physical button or touch button or a touchpad or a touch screen. Furthermore, the input/output interface 150 may include a means for input by an electronic pen (e.g., a digital pen or stylus) or the like. Moreover, the input/output interface 150 may include an audio device for processing audio signals. The audio device may output audio data related to execution of an application. For example, the audio device may output audio data corresponding to occurrence of a touch event, a sound effect corresponding to display adjustment of a screen element (e.g., an object), etc. This audio data output function may not be performed according to a setting or a user input.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various contents (e.g., a text, an image, a video, an icon, a symbol, or the like) to the user. The display 160 may include a touch screen, and may receive a touch, gesture, proximity, pressure or hovering input from an electronic pen or a part of a body of the user.

The display 160 may output, for example, a lock screen including a lock pattern. The display 160 may output a standby screen or home screen including at least one icon. The display 160 may also output a web page screen or the like. The display 160 may output a screen in which the display state of objects (e.g., lock pattern objects, icon objects, and at least one object included in a web page) of the above-mentioned screens has been adjusted based on a specific point related to an input event. The display 160 may output a specific screen (e.g., a lock release screen, an execution screen of a function related to a specific icon, or the like) in response to an additional input event.

The communication interface 170 may set communications between the electronic device 100 and an external device (e.g., the external electronic device 104 or the server 102). For example, the communication interface 170 may be connected to the network 162 via wireless communications so as to communicate with the external device (e.g., the external electronic device 104 or the server 102). The communication interface 170 may receive a web page provided by the server 102.

The wireless communications may employ at least one of cellular communication protocols such as LTE, LTE-advance (LTE-A), code division multiple access (CDMA), wideband CDMA (WCDMA), universal mobile telecommunications system (UMTS), wireless broadband (WiBro), or global system for mobile communications (GSM). Furthermore, the wireless communications may include, for example, short-range communications. The short-range communications may include at least one of wireless fidelity (Wi-Fi), Bluetooth, near field communication (NFC), magnetic stripe transmission (MST), GNSS, or the like.

The GNSS may include, for example, at least one of global positioning system (GPS), global navigation satellite system (GLONASS), BeiDou navigation satellite system (hereinafter referred to as "BeiDou"), or Galileo, the European global satellite-based navigation system. Hereinafter, the term "GPS" and the term "GNSS" may be interchangeably used. A wired communication interface may include at least one of universal serial bus (USB), high definition multimedia interface (HDMI), recommended standard 232 (RS-232), plain old telephone service (POTS), or the like.

The screen operating module 180 may adjust the display state of screen elements in response to occurrence of an input event. For example, the screen operating module 180 may output, to the display 160, a screen including one or more objects. If an input event is received, the screen operating module 180 may adjust the display state of the one or more objects based on a point indicated by the input event. The screen operating module 180 may perform a specified function in response to occurrence of an additional input event. According to various embodiments of the present disclosure, in the case where the additional input event satisfies a specified condition, the screen operating module 180 may perform a specified function, or if the additional input event does not satisfy the specified condition, the screen operating module 180 may restore a display state prior to the adjustment of the object display state. The screen operating module 180 may be implemented with at least one processor. Alternatively, the screen operating module 180 may be implemented with at least a part of a processor. In the case where the screen operating module 180 is implemented with one processor, the screen operating module 180 may be replaced with the processor 120.

Figure 2:
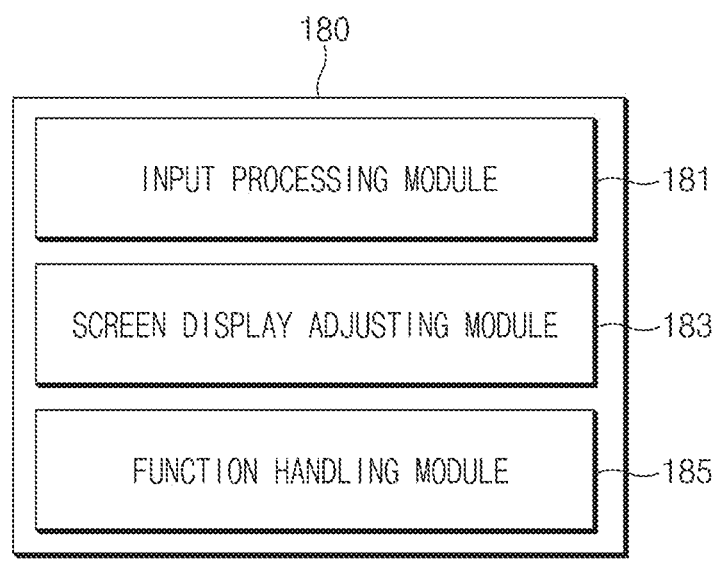
FIG. 2 is a diagram illustrating a configuration of a screen operating module according to an embodiment of the present disclosure.

FIG. 2 is a diagram illustrating a configuration of a screen operating module according to an embodiment of the present disclosure.

Referring to FIG. 2, the screen operating module 180 may include an input processing module 181, a screen display adjusting module 183, or a function handling module 185. Each or at least a portion of the elements of the screen operating module 180 may be implemented with one processor or may be at least a part of a processor. Alternatively, the screen display adjusting module 183 or the function handling module 185 may be provided as a program module and may be loaded on at least one processor so as to be operated to perform a function related to operation of a screen.

According to various embodiments of the present disclosure, the input processing module 181 may collect an event (or event information related to an event) of indicating or selecting a specific point on the display 160. For example, the input processing module 181 may collect a touch event in which a specific point on the display 160 is indicated via a touch screen. The input processing module 181 may receive an input event in which a specific point on the display 160 is indicated via a camera or a microphone. The input processing module 181 may transfer, to the screen display adjusting module 183, an input event of indicating a specific point on the display 160.

The screen display adjusting module 183 may adjust the display state of at least one screen element included in a screen based on a specific point related to an input event that has occurred. For example, the screen display adjusting module 183 may adjust the display state of the screen elements so that the screen elements converge towards the point indicated by the input event (or a distance between the screen elements is reduced). During a converging process, the screen display adjusting module 183 may coordinate the screen elements so that the screen elements do not overlap each other. According to various embodiments of the present disclosure, the screen display adjusting module 183 may display the screen elements so that the screen elements overlap each other at least partially but do not overlay each other to more than a certain degree.

According to various embodiments of the present disclosure, the screen display adjusting module 183 may adjust an arrangement state of screen elements based on a point indicated by an input event. For example, the screen display adjusting module 183 may display, on an occurrence point of the input event, a specific object among a plurality of objects, and may display the other objects so that the other objects converge towards the specific object. A relative location between the objects may be the same as or similar to that prior to the occurrence of the input event. In the case where the screen element is a lock pattern, the screen display adjusting module 183 may change the relative location between the objects in response to the occurrence of the input event.

The function handling module 185 may receive, from the input processing module 181, an additional input event that has occurred on the display 160 in relation to objects, the display state of which has been adjusted. The function handling module 185 may determine whether the additional input event satisfies a specified condition by analyzing the additional input event. If an additional input event that satisfies the specified condition occurs, the function handling module 185 may perform a specified function. For example, if an additional input event related to a lock pattern release occurs, the function handling module 185 may release a lock screen state. If an additional input event related to selection of a specific icon occurs, the function handling module 185 may perform a function mapped to the icon. According to various embodiments of the present disclosure, if an additional input event of selecting a specific object occurs, the function handling module 185 may output, to the display 160, a screen centered on the selected object.

According to various embodiments of the present disclosure, an electronic device may include a display on which one or more objects is/are displayed and a processor for controlling a display state of the display, wherein the processor may adjust, based on a location indicated by a received input event, a display location of the one or more objects displayed on the display so that the one or more objects is/are moved by a specified distance towards the indicated location and is/are displayed.

According to various embodiments of the present disclosure, an electronic device may include a display on which a plurality of objects are displayed and a processor operatively connected to the display, wherein the processor is configured to receive an input event and determine a location indicated by the input event, and move the plurality of objects displayed on the display by a specified distance towards the indicated location or adjusts an interval between the plurality of objects displayed on the display based on the location.

According to various embodiments of the present disclosure, the processor may adjust a distance between the plurality of objects based on the location indicated by the input event to display the plurality of objects.

According to various embodiments of the present disclosure, the processor may adjust a size of the one or more objects to display the one or more objects.

According to various embodiments of the present disclosure, the processor may display an additional object related to execution of a specified function.

According to various embodiments of the present disclosure, the processor may perform a function mapped to the additional object if the additional object overlaps the one or more objects due to an additional input event.

According to various embodiments of the present disclosure, the processor may output a plurality of objects related to a lock pattern, and may reduce and display the lock pattern based on the location indicated by the input event.

According to various embodiments of the present disclosure, if an additional input event satisfies a specified condition, the processor may release a lock function.

According to various embodiments of the present disclosure, if the additional input event does not satisfy the specified condition, the processor may restore an initial lock pattern display state.

According to various embodiments of the present disclosure, the processor may display the lock pattern so that a release start point of the lock pattern matches the location indicated by the input event.

According to various embodiments of the present disclosure, if an entirety of the lock pattern is unable to be displayed when displaying the lock pattern based on the location, the processor may reduce the lock pattern by such a ratio that the entirety of the lock pattern is displayed.

According to various embodiments of the present disclosure, an electronic device may include a display configured to receive a touch input, a processor electrically connected to the display, and a memory electrically connected to the processor, wherein the memory may store instructions that, when executed, cause the processor to display a lock release pattern on at least a part of the display, receive a first user input for selecting a first point on the display, move at least a part of the lock release pattern towards the first point on the display in response to the first user input, receive a second user input to the lock release pattern, the at least a part of which has been moved, and release the lock release pattern at least partially based on a determination that the second user input corresponds to a selected pattern.

Figure 3:
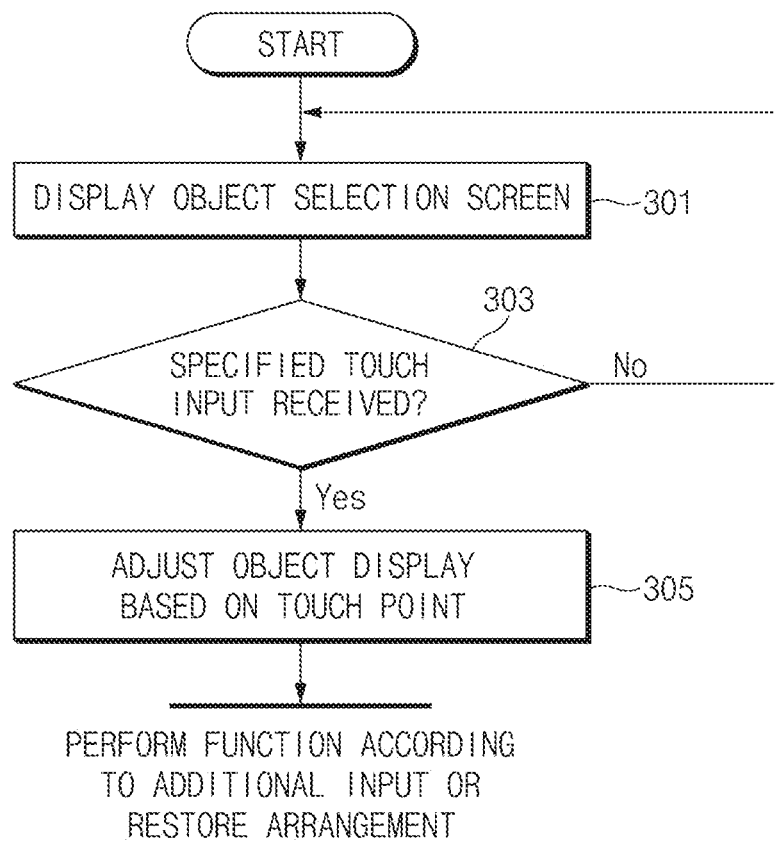
FIG. 3 is a diagram illustrating a screen operating method according to an embodiment of the present disclosure.

FIG. 3 is a diagram illustrating a screen operating method according to an embodiment of the present disclosure.

Referring to FIG. 3, in operation 301, the processor of the electronic device 100 may display an object selection screen. For example, the electronic device 100 may output, to the display 160, a screen including one or more objects corresponding to a lock pattern. Alternatively, the electronic device 100 may output, to the display 160, a screen including at least one icon.

In operation 303, the processor of the electronic device 100 may determine whether a specified touch input is received. If the specified touch input is not received, the process may return to operation 301 so that the electronic device 100 may maintain the state in which the object selection screen is displayed or may perform a specified function. For example, the electronic device 100 may cut off power supply to the display 160 or may switch to a sleep mode.

If the specified touch input occurs, the electronic device 100 may perform object display adjustment based on a touch point in operation 305. For example, the electronic device 100 may display objects on a screen so that the objects converge towards the touch point. During a converging process, the electronic device 100 may change at least one of a size or color of the objects. When the objects converge, traveled distances of the objects may be the same or may be different from each other. For example, if a central object is selected from among the objects, the distances traveled by the other objects may be the same when the other objects converge towards the central object selected. If an outer object is selected from among the objects, the distances traveled by the other objects may be different from each other when the other objects converge towards the outer object selected. Distances among the objects that have converged may be the same. According to various embodiments of the present disclosure, the electronic device 100 may reduce screen elements based on the touch point. The screen elements may include, for example, one or more objects included in a screen, a background screen, a screen layout (or template), or the like.

After performing the object display adjustment based on the touch point, the electronic device 100 may perform a function or may perform arrangement restoration according to an additional input. For example, the electronic device 100 may check an additional user input (e.g., a touch input, a voice input, an input based on image recognition, a sensor signal input by a gesture, or the like) that occurs in the state in which the display state of the objects has been adjusted. According to an embodiment of the present disclosure, the electronic device 100 may receive a touch and drag event and a touch release event after a touchdown event for indicating a touch point occurs. The electronic device 100 may perform a specified function in response to the additional touch input. For example, the electronic device 100 may perform a function related to an icon or a menu positioned at a touch release point. Alternatively, the electronic device 100 may move, in response to a touch and drag input, an icon selected by a touchdown input, and may perform a specific function (e.g., deletion or transmission of the icon) specified by a touch release point. According to various embodiments of the present disclosure, if a touch is released without the touch and drag input after the touchdown input, the electronic device 100 may output, to the display 160, a screen displayed prior to the occurrence of the touch input.

Figure 4:
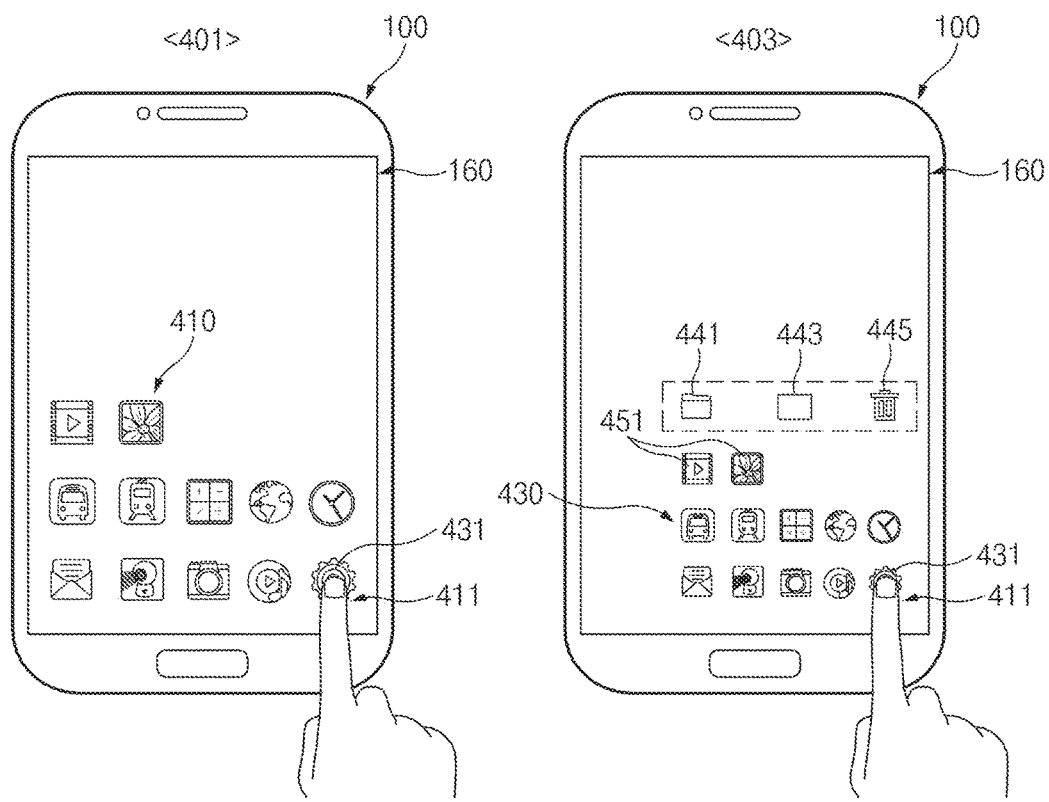
FIG. 4 is a diagram illustrating a screen interface related to controlling a screen in response to a touch according to an embodiment of the present disclosure.

FIG. 4 is a diagram illustrating a screen interface related to controlling a screen in response to a touch according to an embodiment of the present disclosure.

Referring to FIG. 4, as illustrated in a state 401, the processor of the electronic device 100 may output icons having a first icon arrangement state 410 to the display 160. The icons of the first icon arrangement state 410 may be displayed on the display 160 with a first size and a first interval.

According to an embodiment of the present disclosure, if a touch event for selecting a specific icon 431 disposed on a first point 411 occurs, the processor of the electronic device 100 may display, on the display 160, the icons of a second icon arrangement state 430 in which the size of and the interval between the icons have been adjusted based on the first point 411, as illustrated in a state 403. For example, the electronic device 100 may display the second icon arrangement state 430 in which the icons converge towards the first point 411. According to an embodiment of the present disclosure, the electronic device 100 may reduce the size of the icons of the second icon arrangement state 430 to a specified size and may rearrange the icons based on the first point 411. For example, the electronic device 100 may display the icons with a second size and a second interval which are smaller than the first size and the second interval respectively.

According to an embodiment of the present disclosure, the electronic device 100 may output, to a certain portion on the display 160, additional icons 441, 443, and 445 related to execution of specific functions. For example, the electronic device 100 may arrange the additional icons 441, 443, and 445 within a certain distance from the first point 411, or may arrange the additional icons 441, 443, and 445 so that the additional icons 441, 443, and 445 are adjacent to outer icons 451 arranged farthest from the first point 411 among the icons.

According to an embodiment of the present disclosure, the additional icons 441, 443, and 445 may include, for example, a folder icon 441, a page generation icon 443, and a delete icon 445. If the folder icon 441 overlaps the specific icon 431 due to a drag event that occurs after the touch event for selecting the specific icon 431, the electronic device 100 may add the specific icon 431 to the folder icon 441. If a touch is released after the specific icon 431 is dragged and is overlapped by the folder icon 441, the electronic device 100 may output, to a certain portion on the display 160, the folder icon 441 containing the specific icon 431, without displaying the specific icon 431 on the display 160. When the touch is released, the electronic device 100 may output the other icons to original locations thereof (e.g., the state 401). According to various embodiments of the present disclosure, if a touch release occurs after the specific icon 431 is dragged and is at least partially overlapped by the delete icon 445, the electronic device 100 may delete the specific icon 431 from the display 160.

According to various embodiments of the present disclosure, the electronic device 100 may apply a touch event on the first point 411 as at least one of an input signal for reducing the size of a current screen, a center point for reducing the size of the current screen, or an input for selecting an icon positioned at the point. For example, if a touch event occurs on the first point 411, the electronic device 100 may select the icon 431 while displaying, based on the first point 411, a reduced screen in which the icons arranged on a screen are reduced. For example, if a touch and drag event occurs while a touchdown event occurs, the electronic device 100 may move and display the icon 431 in response to the touch and drag event. In the case where the icon 431 overlaps a specific additional icon, for example, the delete icon 445, the electronic device 100 may delete the icon 431 from the screen. As described above, the electronic device 100 may apply an input event for reducing a screen as an input signal related to a corresponding point.

Figure 5:
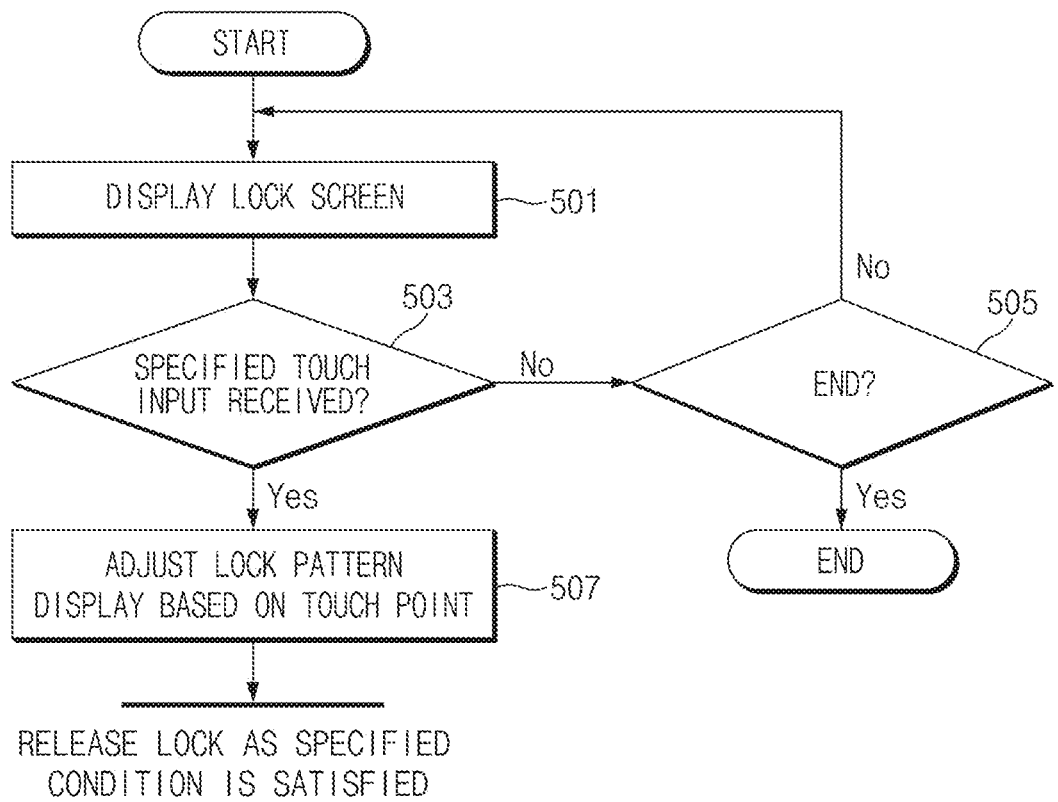
FIG. 5 is a flow diagram illustrating a screen operating method related to a lock function according to an embodiment of the present disclosure.

FIG. 5 is a diagram illustrating a screen operating method related to a lock function according to an embodiment of the present disclosure.

Referring to FIG. 5, in operation 501, the processor of the electronic device 100 may display a lock screen. For example, if a wakeup event occurs in a sleep state, the electronic device 100 may output a lock screen to the display 160. Alternatively, the electronic device 100 may output the lock screen to the display 160 if an application for which a lock function is set is requested to be executed.

In operation 503, the processor of the electronic device 100 may determine whether a specified touch input is received. If the specified touch input does not occur, the process may proceed to operation 505 so that the electronic device 100 may determine whether an event related to function termination occurs. If the event related to the function termination occurs or a specified time has elapsed, the electronic device 100 may perform function handling according to the function termination. For example, the electronic device 100 may control transition to a sleep state. If the event related to the function termination does not occur, the process may return to operation 501 so that the electronic device 100 may maintain the state in which the lock screen is displayed.

If the specified touch input is received, the processor of the electronic device 100 may perform a lock pattern display adjustment based on a touch point in operation 507. For example, the electronic device 100 may adjust a location of a lock pattern so that the lock pattern shrinks to a specified size in a direction towards a touch occurrence point. In operation 507, the electronic device 100 may reduce a size of one or more objects included in the lock pattern to a specified size.

According to various embodiments of the present disclosure, the processor of the electronic device 100 may move the lock pattern based on a touch point so that a lock release start point matches the touch point. In this operation, the electronic device 100 may adjust the size of the objects so that the entirety of the lock pattern is displayed within the display 160. Furthermore, the electronic device 100 may regard the touch operation as specifying the lock release start point.

According to an embodiment of the present disclosure, the electronic device 100 may perform a lock release as a specified condition is satisfied. For example, if a specific input pattern is received using a display-state-adjusted lock pattern, the electronic device 100 may compare the input pattern with a specified lock release pattern to determine whether the former is identical to the latter. If the input pattern is identical to the specified lock release pattern, the electronic device 100 may release a lock, since the specified condition for releasing the lock has been satisfied. According to various embodiments of the present disclosure, if the specified condition for releasing the lock is not satisfied, the electronic device 100 may maintain a locked state and may notify a lock release failure.

Figure 6:
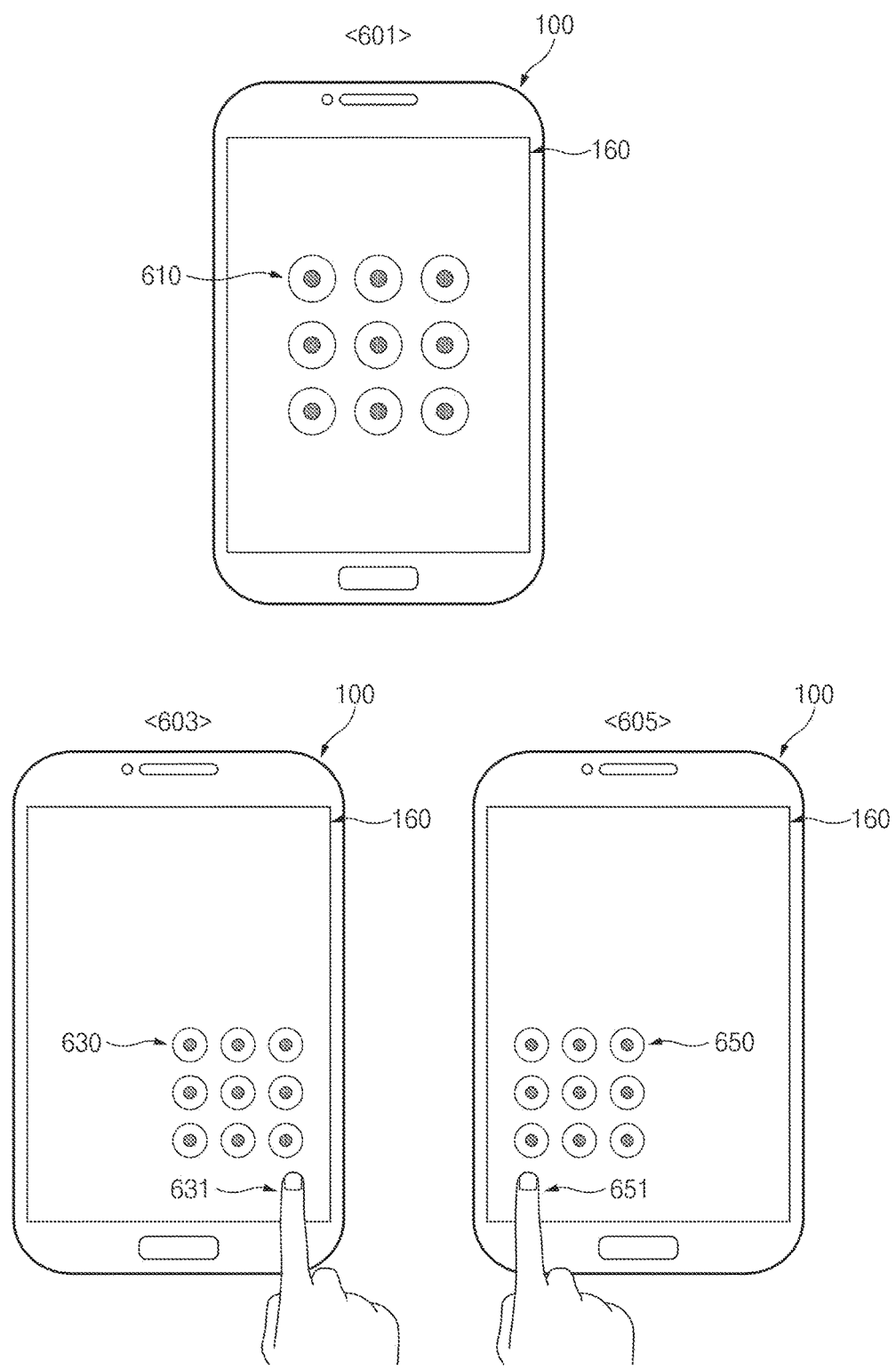
FIG. 6 is a diagram illustrating an example of a screen interface related to a lock pattern display adjustment in response to a touch according to an embodiment of the present disclosure.

FIG. 6 is a diagram illustrating an example of a screen interface related to a lock pattern display adjustment in response to a touch according to an embodiment of the present disclosure.

Referring to FIG. 6, according to various embodiments of the present disclosure, the processor of the electronic device 100 may output a first lock pattern 610 to the display 160, as shown in a state 601. The first lock pattern 610 may have a first size and a first interval, and may include nine objects arranged on a specified portion (e.g., a central portion of a screen) on the display 160.

As illustrated in FIG. 6, in a state 603, if a touch event occurs on a first location 631 on the display 160, the processor of the electronic device 100 may output, to the display 160, a second lock pattern 630 obtained by reducing a size of the first lock pattern 610 and rearranging the lock pattern 610 based on the first location 631. For example, the electronic device 100 may display the second lock pattern 630 at a location adjacent to the first location 631. The second lock pattern 630, for example, may be formed by reducing at least one of the size of or interval between the objects included in the first lock pattern 610 to a specified value. When displaying the second lock pattern 630, the electronic device 100 may display the second lock pattern 630 so that one corner (e.g., a lower right corner) of the second lock pattern 630 is adjacent to the first location 631. According to various embodiments of the present disclosure, the electronic device 100 may dispose, on the first location (touch point), a specific point included in the second lock pattern 630. The specific point may be a lock release start point. The electronic device 100 may recognize the touch event that has occurred on the first location 631 as a touch on the lock release start point. Accordingly, if a drag operation for releasing a lock is performed, the electronic device 100 may determine whether an input pattern is a lock release pattern based on the specific point on the first location 631.

According to various embodiments of the present disclosure, the electronic device 100 may differently perform arrangement or reduction of objects depending on an area in which the objects are not arranged. For example, if a touch occurs on the first location 631 at a lower right side of the electronic device 100, the electronic device 100 may arrange and reduce the objects based on a lower right object. If a touch occurs on a second location 651 at a lower left side of the electronic device 100, the electronic device 100 may arrange or reduce the objects based on a lower left object. The objects may be not only a lock pattern but also icons, widgets, or the like.

As illustrated in FIG. 6, in a state 605, if a touch event occurs on a second location 651 on the display 160, the processor of the electronic device 100 may output, to the display 160, a third lock pattern 650 obtained by reducing the size of the first lock pattern 610 and rearranging the lock pattern 610 based on the second location 651. For example, the electronic device 100 may display the third lock pattern 650 at a location adjacent to the second location 651. The third lock pattern 650, for example, may be formed by reducing at least one of the size of or an interval between the objects included in the first lock pattern 610 to a specified value. The third lock pattern 650 may be displayed at a different location from that of the second lock pattern 630 but may have substantially the same shape as the second lock pattern 630. When displaying the third lock pattern 650, the electronic device 100 may display the third lock pattern 650 so that one corner (e.g., a lower left corner) of the third lock pattern 650 is adjacent to the second location 651. According to various embodiments of the present disclosure, the electronic device 100 may display the third lock pattern 650 so that the second location 651 is a lock release start point. In this operation, the electronic device 100 may adjust the size of the third lock pattern 650 so that the entire lock pattern is disposed within the display 160 even if the lock release start point is disposed on the second location 651.

Figure 7:
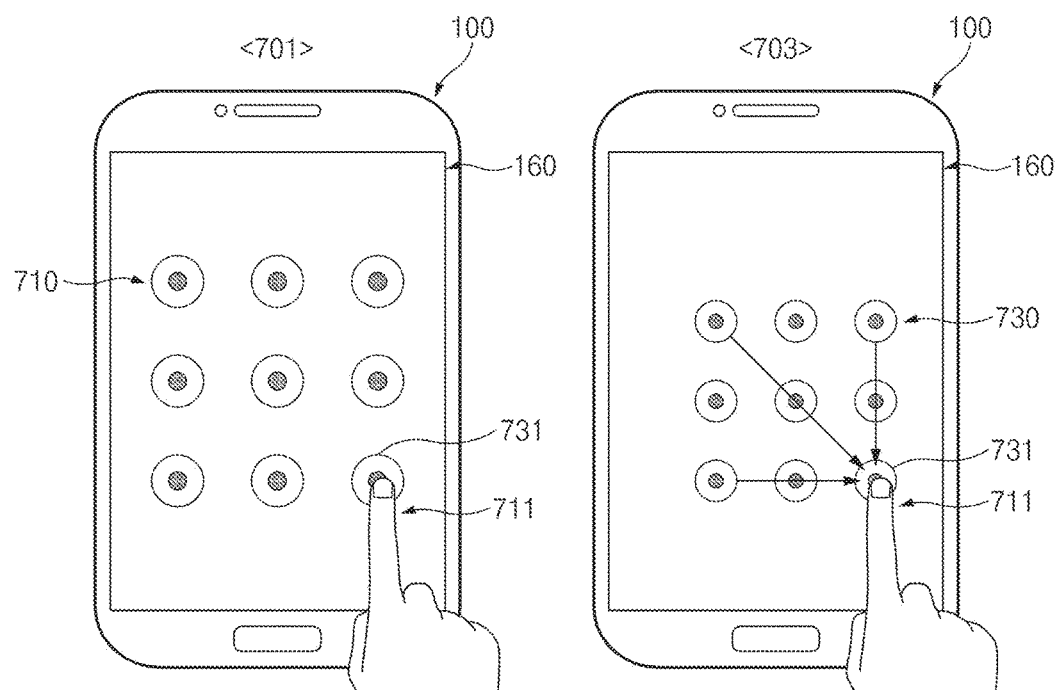
FIG. 7 is a diagram illustrating an example of a screen operation in response to a touch on a lock pattern according to an embodiment of the present disclosure.

FIG. 7 is a diagram illustrating an example of screen operation in response to a touch on a lock pattern according to an embodiment of the present disclosure.

Referring to FIG. 7, in a state 701, the processor of the electronic device 100 may output, to the display 160, a lock screen including a first lock pattern 710. The first lock pattern 710, for example, may include a plurality of objects having a fixed size and spaced apart from each other by a certain distance. In relation to a lock release, the user may generate a touch event for selecting a specific object, for example, a lower right object 731 disposed on a lower right side location 711.

Accordingly, as illustrated in FIG. 7, in a state 703, the processor of the electronic device 100 may output a second lock pattern 730 to the display 160. The second lock pattern 730 may include objects having a reduced size or a reduced interval or both in comparison with the first lock pattern 710. According to various embodiments of the present disclosure, compared to the objects of the first lock pattern 710, the objects other than the lower right object 731 of the second lock pattern 730 converge towards the lower right object 731 (as indicated by the straight-line arrows converging on the lower right object 731 in FIG. 7). Here, the objects that converge towards the lower right object 731 may be reduced in size. The objects that converge towards the lower right object 731 may be arranged so as not to overlap each other.

Figure 8:
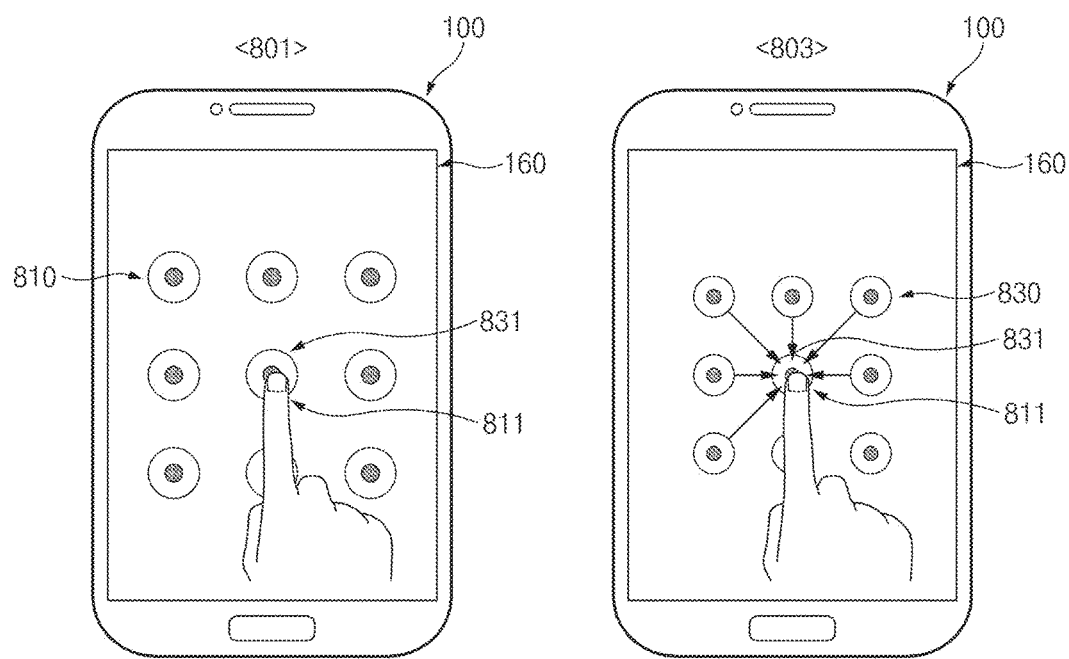
FIG. 8 is a diagram illustrating another example of a screen operation in response to a touch on a lock pattern according to an embodiment of the present disclosure.

FIG. 8 is a diagram illustrating another example of screen operation in response to a touch on a lock pattern according to an embodiment of the present disclosure.

Referring to FIG. 8, in a state 801, the processor of the electronic device 100 may output, to the display 160, a lock screen including a first lock pattern 810. The first lock pattern 810, for example, may include a plurality of objects having a fixed size, with the objects spaced apart from each other by a certain distance. In relation to a lock release, the user may generate a touch event for selecting a specific object, for example, a central object 831 disposed on a central location 811.

Accordingly, as illustrated in FIG. 8, in a state 803, the processor of the electronic device 100 may output a second lock pattern 830 to the display 160. The second lock pattern 830 may include objects having a reduced size or a reduced interval (e.g., distance between the objects) or both in comparison with the first lock pattern 810. According to various embodiments of the present disclosure, compared to the objects of the first lock pattern 810, the objects, other than the central object 831 of the second lock pattern 830, converge towards the central object 831. In this example, the objects that converge towards the central object 831 may be reduced in size. The objects that converge towards the central object 831 may preferably be arranged so as not to overlap each other.

Figure 9:
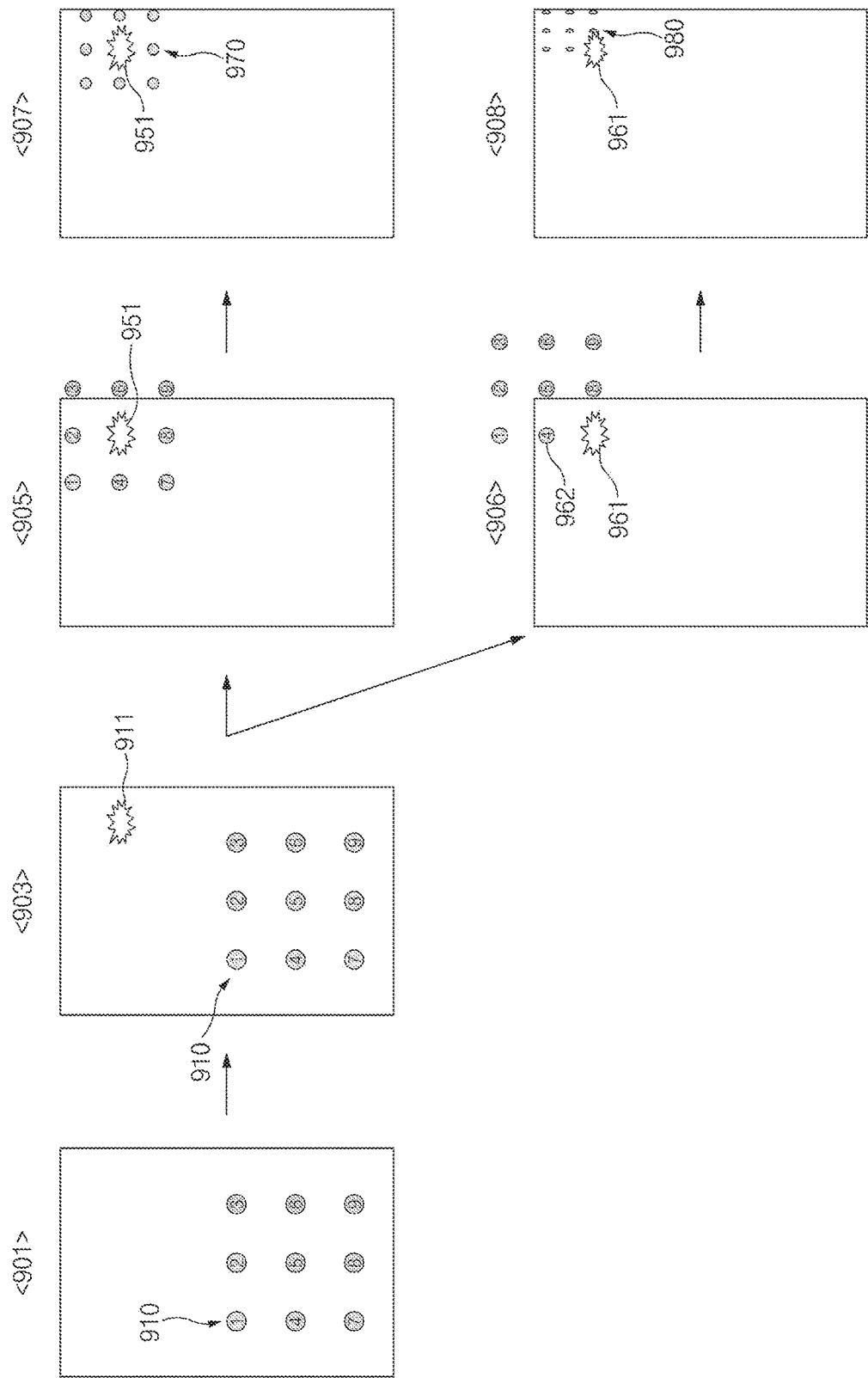
FIG. 9 is a diagram illustrating various examples of lock pattern displays according to various embodiments of the present disclosure.

FIG. 9 is a diagram illustrating various examples of lock pattern displays according to an embodiment of the present disclosure.

Referring to FIG. 9, in a state 901, the processor of the electronic device 100 may output, to a certain location on the display 160, a first lock pattern 910. The first lock pattern 910, for example, may include nine objects arranged on a certain location (e.g., a lower center portion of a screen). In a state 903, if the user touches a first point 911 on the display 160, the electronic device 100 may receive a touch event that occurs on the first point 911. According to various embodiments of the present disclosure, the first point 911 may be outside an area in which the first lock pattern 910 is displayed. The electronic device 100 may move and output the lock pattern based on the occurrence point of the touch event. In this operation, if the entire lock pattern having a certain size (e.g., a lock pattern with a default reduced size) is unable to be output based on the occurrence point of the touch event (e.g., if a portion of the objects of the lock pattern is unable to be displayed on the display as shown in a state 905 or 906), the electronic device 100 may adaptively change the size of the lock pattern. For example, as shown in a state 907 or 908, the electronic device 100 may reduce the lock pattern so that all the objects of the lock pattern are displayed on the display. When reducing the lock pattern, the electronic device 100 may change a reduction ratio of the lock pattern according to the location of the touch event and a lock release pattern start point of the lock pattern, and thus the distances between the objects of the lock pattern 910 may be changed (reduced) as in a sates 907 or 908.

For example, in the case where the lock release pattern start point is a central object 951, the processor of the electronic device 100 may output, to the display, a screen in which the first lock pattern 910 is rearranged so that the central object 951 is disposed on the first point 911 and the first lock pattern 910 is centered on the central object 951, as shown in the state 905 in FIG. 9. For example, in the case where the lock release pattern start point is the central object 951 (e.g., object number 5), the electronic device 100 may dispose the central object 951 on the first point 911 and may rearrange the other objects based on the central object 951. Here, if the interval between the objects of the first lock pattern 910 is equal to or larger than a certain value, only a portion of the objects of the first lock pattern 910 may be displayed on the display 160.

According to various embodiments of the present disclosure, in the case where the entire lock pattern is unable to be displayed on the display 160 since the interval between the objects included in the lock pattern is equal to or larger than the certain value, the processor of the electronic device 100 may adjust a display state of the lock pattern so as to output a second lock pattern 970 to the display 160 as illustrated in the state 907. Here, the electronic device 100 may arrange the objects so that the central object 951 remains on the first point 911 and the other objects converge towards the central object 951. The interval between the objects for the convergence may be determined as such a value that all the objects included in the lock pattern may be displayed on the display 160. In this operation, the electronic device 100 may also reduce the size of the objects to a certain size. According to various embodiments of the present disclosure, the electronic device 100 may change the lock pattern from the state 903 to the state 907 without intervention of the state 905.

A state 906 in FIG. 9 illustrates another example in which the lock release pattern start point is placed on another location. For example, in the state 906, the lock release pattern start point may be a lower left object 961 (e.g., object number 7). The electronic device 100 may dispose the lower left object 961 on the first point 911, and may rearrange the other objects of the lock pattern based on the lower left object 961. Here, in the case where a specified interval (e.g., a default reduced interval) between the objects of the first lock pattern 910 is maintained, if the first lock pattern 910 is displayed based on the lower left object 961, only the lower left object 961 and a left intermediate object 962 may be displayed as shown in the state 906 in FIG. 9.

In the case where the entire lock pattern is unable to be displayed since the first lock pattern 910 is displayed based on the lower left object 961, the electronic device 100 may output a third lock pattern 980 obtained by adjusting the size of and interval (or distance) between the objects as shown in a state 908 in FIG. 9. The third lock pattern 980 may have such a size that the lower left object 961 is positioned on the first point 911 and all the objects are able to be output to the display 160.

According to various embodiments of the present disclosure, the electronic device 100 may treat a touch event on the first point 911 on which a touch event has occurred, as an input signal for releasing a lock. For example, as shown in the state 907 in FIG. 9, if a touch event occurs on the first point 911, the electronic device 100 may treat the central object 951 as being selected, while outputting the second lock pattern 970 including the central object 951. Thereafter, the electronic device 100 may determine whether to release a lock based on a combination of an additional touch and drag event and an initially input touch event.

FIG. 10A is a diagram illustrating a state related to a lock pattern display according to an embodiment of the present disclosure.

Referring to FIG. 10A, if a touch event occurs on a first point 1011 while a lock pattern is output to the display 160, the electronic device 100 may dispose, on the first point 1011, a specific object (e.g., a lower left object) corresponding to a lock release start point. Accordingly, at least a portion of the other objects is unable to be output to the display 160.

In this state, the electronic device 100 may allow the entire lock pattern to be output to the display 160 by adjusting at least one of the size of or interval (or distance) between the objects included in the lock pattern. Referring to FIG. 10A, D may represent a value of the interval or distance between the objects. Xref may represent a value of a relatively short distance among distances from the start point, on which a touch occurs, to an edge of the display 160 in an X-axis direction. Yref may represent a value of a relatively short distance among distances from the start point, on which a touch occurs, to an edge of the display 160 in a Y-axis direction. Xd may represent a value of a distance from the start point, on which a touch occurs, in a lock pattern reduced to a specified size to an X-axial outermost object of an initial lock pattern. Yd may represent a value of a distance from the start point, on which a touch occurs, in the lock pattern reduced to the specified size to a Y-axial outermost object of the initial lock pattern.

Figure 10B:
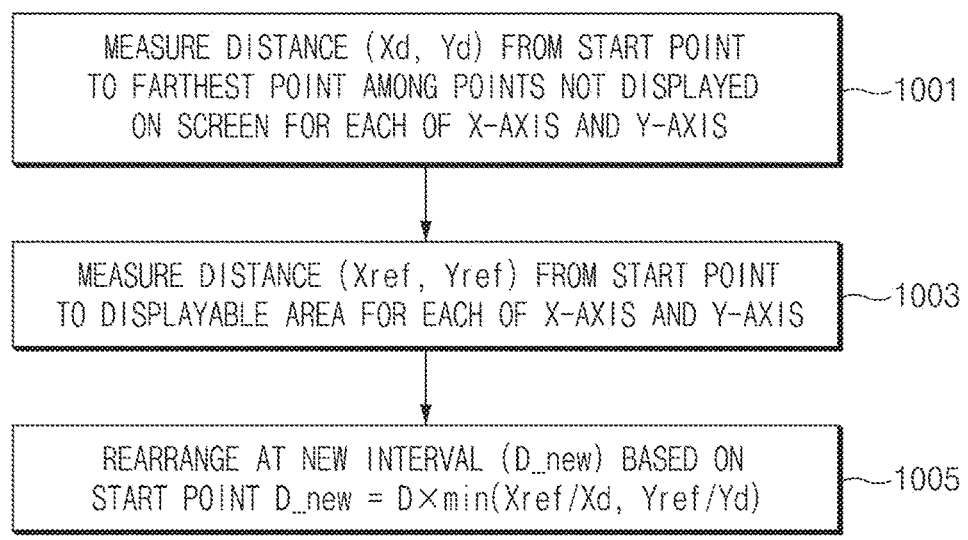
FIG. 10B is a diagram illustrating adjustment of a lock pattern display according to an embodiment of the present disclosure.

FIG. 10B is a diagram illustrating adjustment of a lock pattern display according to an embodiment of the present disclosure.

Referring to FIGS. 10A and 10B, the electronic device 100 may receive the touch event 1010 occurring on the display 160. The touch event 1010 may be applied as a lock release pattern start point of the lock pattern. In operation 1001, the electronic device 100 may measure distances (Xd, Yd) from the lock release pattern start point of the lock pattern to a farthest point among points not displayed on the screen for each of the X-axis and the Y-axis.

In operation 1003, the electronic device 100 may measure distances (Xref, Yref) from the start point to an end of a displayable area for each of the X-axis and the Y-axis. For example, these distances may represent a distance from the start point to one side of the display 160 of the electronic device 100.

In operation 1005, the electronic device 100 may rearrange the objects at a new interval D_new based on the start point. D_new may be expressed as D×min (Xref/Xd, Yref/Yd).

As described above, the electronic device 100 may allow the entire lock pattern to be output to the display 160 by adjusting at least one of the interval between the objects or the size of the lock pattern based on a distance from a specified object to an edge of the display 160.

According to various embodiments of the present disclosure, in the case where a value of Xref/Xd is equal to or larger than a specified value, the electronic device 100 may reduce a lock pattern by a set certain ratio smaller than the specified value. For example, a lock release start point may be a central point. In this case, considering that the electronic device 100 disposes the central point of the lock pattern on the first point 1011, Xref/Xd may have a value approximating to 1. Furthermore, Yref/Yd may have a value of 1. As described above, in the case where the ratio of each axis has a value equal to or larger than a specified value (e.g., 1/2), the lock pattern may be reduced by a specified ratio (e.g., 1/2, 1/3, etc.) in order to reduce a drag operation scope of the user. In the case where the ratio of Xref/Xd or the ratio of Yref/Yd is equal to or smaller (e.g., 1/3, etc.) than a specified ratio (e.g., 1/2), the electronic device 100 may reduce the lock pattern by a ratio (e.g., 1/3) obtained by calculation.

According to various embodiments of the present disclosure, a start object of the lock pattern may be displayed on the location of the touch event 1010. The location or shape of the lock pattern may be changed (e.g., reduction, object interval decrease, etc.) based on the location of the touch event 1010 to display the lock pattern. The location or shape of the lock pattern may be changed based on the location of the touch event 1010. In the case where the user is unable to perform a drag operation on the lock pattern if the size of the lock pattern or the interval between the objects is reduced based on the location of the touch event 1010 (e.g., in the case where the ratio of Xref/Xd is smaller than 1/5), the lock pattern may be displayed without changing the location or shape of the lock pattern.

Figure 11:
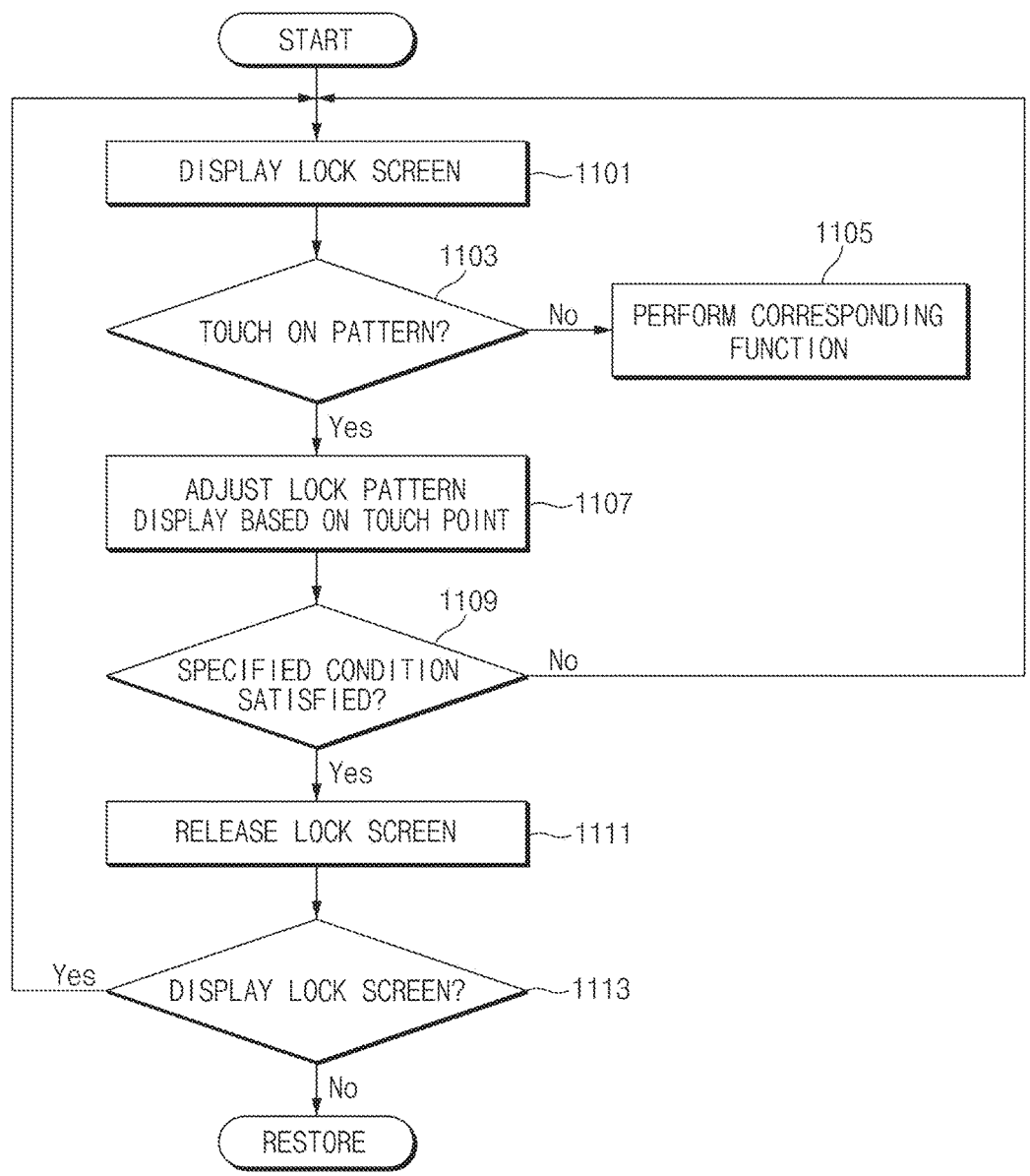
FIG. 11 is a flow diagram illustrating a lock screen operating method according to an embodiment of the present disclosure.

FIG. 11 is a diagram illustrating a lock screen operating method according to an embodiment of the present disclosure.

Referring to FIG. 11, in operation 1101, the processor of the electronic device 100 may display a lock screen on the display 160. For example, the electronic device 100 may output the lock screen when the electronic device 100 switches from a sleep state to a wakeup state or a specified application is executed according to a lock screen output setting.

In operation 1103 illustrated in FIG. 11, the processor of the electronic device 100 may determine whether a touch event occurs on the pattern. If no touch event occurs on the pattern, the electronic device 100 may perform a function corresponding to an event that occurs in operation 1105. For example, if no touch event occurs, the electronic device 100 may maintain a lock screen output state. Alternatively, the electronic device 100 may switch to a sleep state if a specified time elapses without occurrence of a touch event.

If the touch event occurs on the pattern in operation 1103, the processor of the electronic device 100 may perform a lock pattern display adjustment based on a touch point in operation 1107. For example, the electronic device 100 may arrange objects of the lock pattern so that the objects other than an object selected by the touch event converge towards the selected object. In this operation, the electronic device 100 may reduce at least one of the size of the objects that converge or the size of the selected object to a certain size. According to various embodiments of the present disclosure, the electronic device 100 may display the display-state-adjusted objects so that the display-state-adjusted objects are differ in at least one of color, brightness, or shape from the objects of the initially displayed lock pattern. The electronic device 100 may treat the touch event that has occurred on the pattern as user input information. For example, if an event of selecting a specific object from among the objects of the lock pattern occurs, the electronic device 100 may treat the selected object as input information for a lock release pattern. Here, the electronic device 100 may reduce the lock pattern to a specified size and display the reduced lock pattern based on an object selection point.

In operation 1109, illustrated in FIG. 11, the processor of the electronic device 100 may determine whether a specified condition is satisfied. For example, the electronic device 100 may determine whether a specified touch event occurs on a display-state-adjusted lock pattern. If an event (e.g., a touch and drag event corresponding to a lock release pattern) that satisfies the specified condition occurs, the electronic device 100 may perform a lock screen release in operation 1111. As a lock screen is released, the electronic device 100 may output a specified screen (e.g., a standby screen, a home screen, an execution screen of a specific application, or the like) to the display 160. In this operation, the electronic device 100 may also treat the touch event that has occurred in operation 1103 as input information for releasing a lock so as to determine whether the touch event satisfies the specified condition.

If there is no event that satisfies the specified condition, the process may return to operation 1101, illustrated in FIG. 11, so that the electronic device 100 may maintain the lock screen display state. According to various embodiments of the present disclosure, the electronic device 100 may output guide information corresponding to a failure of a lock screen release attempt. As the process returns to operation 1101, the electronic device 100 may maintain the display state of the display-state-adjusted lock pattern. Alternatively, as the process returns to operation 1101, the electronic device 100 may restore an original display state of the display-state-adjusted lock pattern.

If an event related to a request for displaying a lock screen occurs in operation 1113, illustrated in FIG. 11, the process may return to operation 1101 so that the electronic device 100 may re-perform operation 1101 and the following operations. If there is no event related to the request for displaying a lock screen, the electronic device 100 may return to a previous state so as to maintain a lock screen-released state.

According to various embodiments of the present disclosure, a screen operating method may include displaying one or more objects, receiving an input event, and displaying the one or more objects by moving the one or more objects displayed on a display by a specified distance towards a location indicated by the input event.

According to various embodiments of the present disclosure, the displaying may include displaying the one or more objects by adjusting an interval between a plurality of objects based on the location indicated by the input event.

According to various embodiments of the present disclosure, the displaying may include displaying the one or more objects by adjusting a size of the one or more objects.

According to various embodiments of the present disclosure, the displaying may include displaying an additional object related to execution of a specified function.

According to various embodiments of the present disclosure, the method may further include receiving an additional input event and performing a function mapped to the additional object if the additional object overlaps the one or more objects due to the additional input event.

According to various embodiments of the present disclosure, the displaying may include outputting a plurality of objects related to a lock pattern and reducing and displaying the lock pattern based on the location indicated by the input event.

According to various embodiments of the present disclosure, the method may further include receiving an additional input event and releasing a lock function if the additional input event satisfies a specified condition.

According to various embodiments of the present disclosure, the method may further include receiving an additional input event and restoring an initial lock pattern display state if the additional input event does not satisfy a specified condition.

According to various embodiments of the present disclosure, the displaying may include displaying a lock pattern so that a release start point of the lock pattern matches the location indicated by the input event.

According to various embodiments of the present disclosure, the displaying may include reducing the lock pattern by such a ratio that the entirety of the lock pattern is displayed if the entirety of the lock pattern is unable to be displayed when the lock pattern is displayed based on the location.

Figure 12:
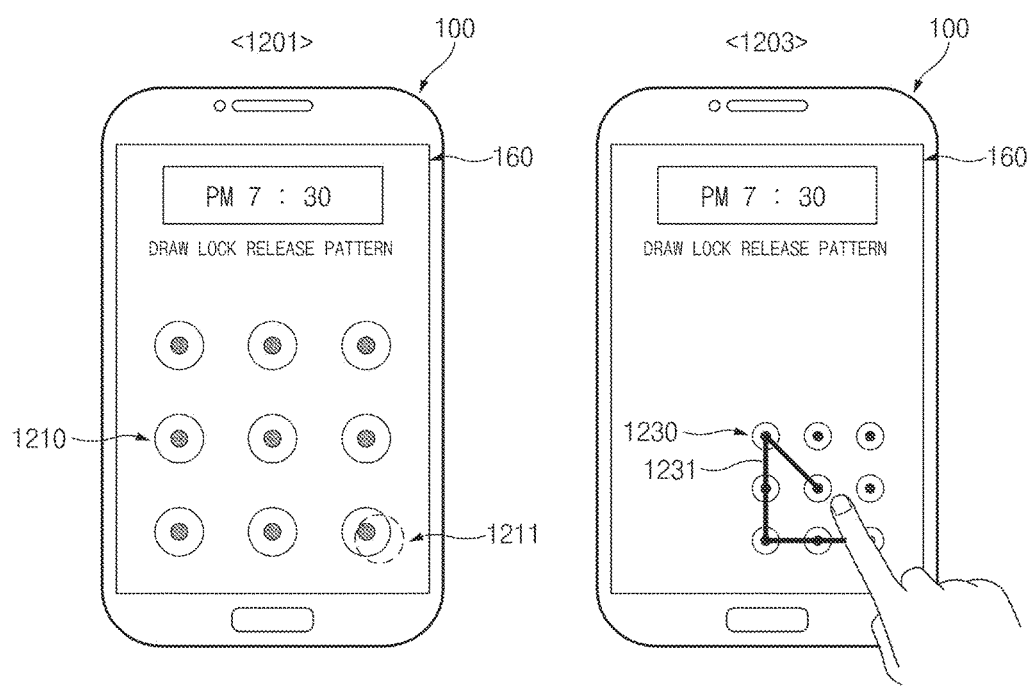
FIG. 12 is a diagram illustrating a lock release operation according to an embodiment of the present disclosure.

FIG. 12 is a diagram illustrating a lock release operation according to an embodiment of the present disclosure.

Referring to FIG. 12, as shown in a state 1201, the electronic device 100 may output, to the display 160, a lock screen including a first lock pattern 1210. In this operation, the electronic device 100 may further display other objects such as a time display object, a guide information object, etc.

According to an embodiment of the present disclosure, if a touch event occurs on a first point 1211, as illustrated in FIG. 12, the electronic device 100 may output a second lock pattern 1230 obtained by adjusting at least one of the size of lock objects of the first lock pattern 1210 or the interval between the lock objects based on the first point 1211, as shown in a state 1203. FIG. 12 exemplarily illustrates the case in which the second lock pattern 1230 is obtained by changing or reducing the size of the objects and the interval (or distance) between the objects to specified values.

If an additional event 1231 is received, as illustrated in FIG. 12, the electronic device 100 may determine whether the additional event 1231 satisfies a specified condition. Referring to FIG. 12, the additional event 1231 may include a drag event for connecting (such as in a sequence) some or all of the lock objects to release a lock. If the additional event 1231 matches a specified drag event for releasing a lock, the electronic device 100 may release a lock screen. The electronic device 100 may restore a previous state (e.g., the state 1201) if the additional event 1231 does not correspond to a lock release value. According to various embodiments of the present disclosure, the electronic device 100 may output guide information about a failure of a lock release. According to various embodiments of the present disclosure, the electronic device 100 which outputs the second lock pattern 1230 may maintain an original state of the time display object or the guide information object.

Figure 13:
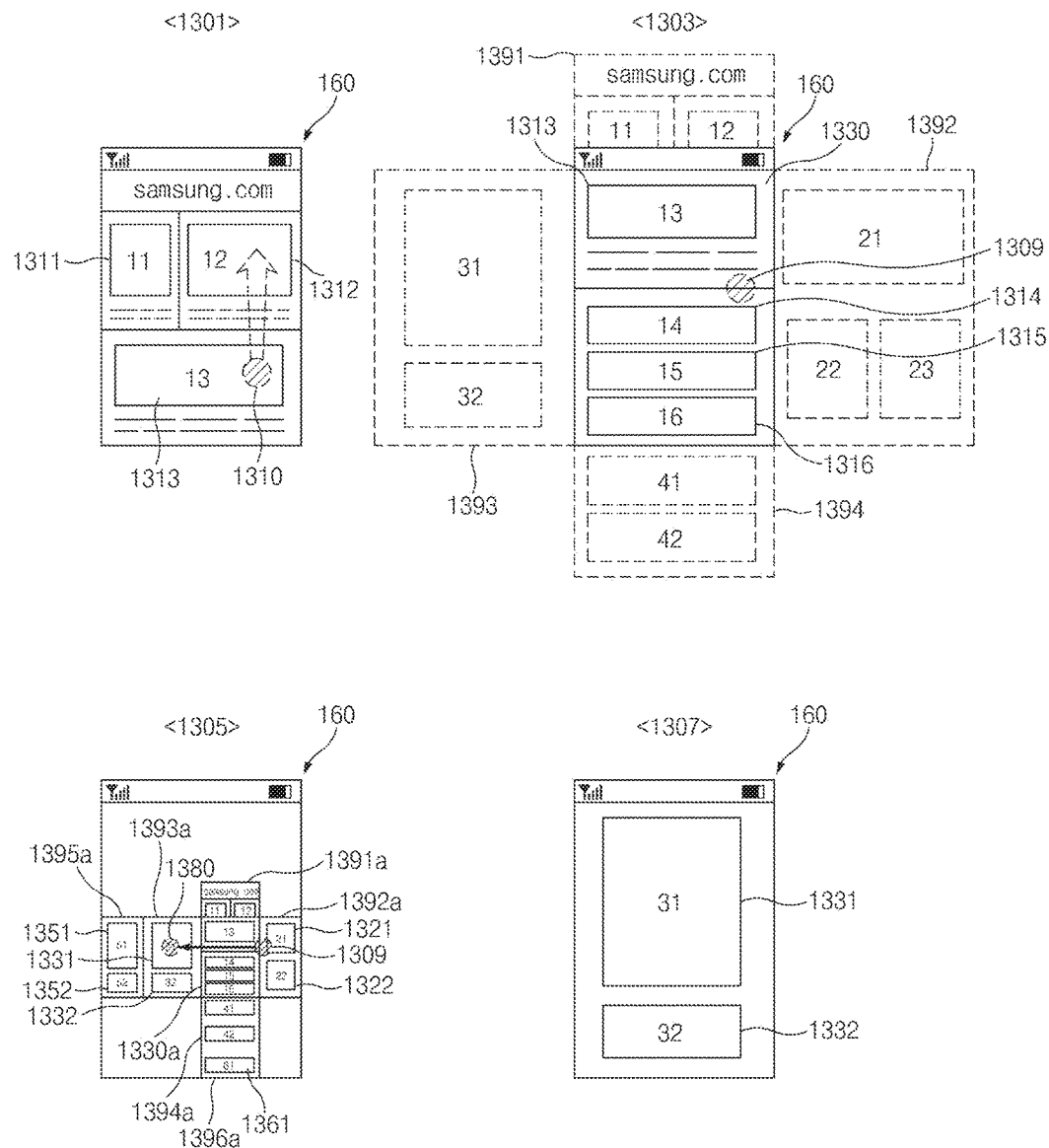
FIG. 13 is a diagram illustrating a screen interface for describing an operation of a screen on which a page is displayed according to an embodiment of the present disclosure.

FIG. 13 is a diagram illustrating a screen interface for describing an operation of a screen on which a page is displayed according to an embodiment of the present disclosure.

Referring to FIG. 13, as shown in a state 1301, the electronic device 100 may output, to the display 160, a page including at least one area based on a specified-type template or layout. The page may include, for example, an 11th area 1311, a 12th area 1312, and a 13th area 1313. The page may be a web page provided by a server accessed via a specific uniform resource locator (URL) address. Alternatively, the page may be provided by a cloud server. Alternatively, the page may be provided due to a connection to another external device. Alternatively, the page may be provided by executing a phonebook function.

According to various embodiments of the present disclosure, for example, if a scroll event 1310 occurs on the 13th area 1313, the electronic device 100 may output a page including other areas in response to application of the scroll event 1310 as shown in a state 1303. In the state 1303, the electronic device 100, for example, may output, to the display 160, a displayed page area 1330 including the 13th area 1313, a 14th area 1314, a 15th area 1315, and a 16th area 1316. According to various embodiments of the present disclosure, the electronic device 100 may store, in a memory, non-displayed page areas that are not output to the display 160. Accordingly, as illustrated in FIG. 13, the electronic device 100 may output, to the display 160, a first non-displayed page area 1391, a second non-displayed page area 1392, a third non-displayed page area 1393, and a fourth non-displayed page area 1394 in response to a user input. The non-displayed page areas 1391 to 1394 may represent areas related to a currently displayed area. Alternatively, the non-displayed page areas 1391 to 1394 may represent areas that may be provided as a drag event occurs or a specific function is performed.

According to various embodiments of the present disclosure, the electronic device 100 may receive a specified first touch event 1309 (e.g., a long-press event, a short-press event or an event of applying a specified pressure) on the display 160. Accordingly, as shown in a state 1305, the electronic device 100 may display, on the display 160, a display-state-adjusted page including an adjusted displayed page area 1330a and adjusted non-displayed page areas 1391a, 1392a, 1393a, 1394a, 1395a, and 1396a. The adjusted non-displayed page areas may represent areas corresponding to the non-displayed page areas 1391 to 1394 and non-displayed page areas (not shown).

While the adjusted displayed page area and the adjusted non-displayed page areas are output as shown in the state 1305, the electronic device 100 may change a scope of non-displayed page areas to be output to the display 160 according to a location of the first touch event 1309. For example, in the case where the first touch event 1309 occurs on a portion of the screen which is slightly above a right intermediate portion of the screen, the electronic device 100 may output, to the display 160, a portion (e.g., a part of a 21st area 1321 and a 22nd area 1322) of areas (the 21st area, the 22nd area, and a 23rd area) included in the second non-displayed area 1392, as shown in the state 1305. As described above, the electronic device 100 may use the location of the first touch event 1309 as a center point for reducing a current screen. Furthermore, the electronic device 100 may use the location of the first touch event 1309 as a reduction center point for non-displayed page areas that are not reduced in a current screen. As the first touch event 1309 occurs on the portion of the screen which is slightly above the right intermediate portion of the screen, the electronic device 100 may display a portion of the non-displayed page area 1392 on the display 160, and may display the entirety of the non-displayed page area 1393 on the display 160. Alternatively, the electronic device 100 may output a non-displayed page area disposed at a left side of the non-displayed page area 1393 to the display 160 as the adjusted non-displayed page area 1395a. Accordingly, the electronic device 100 may additionally output, to the display 160, a 51st area 1351 and a 52nd area 1352 included in the fifth adjusted non-displayed page area. The adjusted non-displayed page area 1395a may be disposed at the left side of the non-displayed page area 1393 so as to be output to the display 160 in response to occurrence of a scroll event or a swipe event.

The sixth adjusted non-displayed page area may correspond to a page area disposed under the fourth non-displayed page area 1394. If the first touch event 1309 occurs on the right intermediate portion of the screen or a portion above the right intermediate portion, the electronic device 100 may display the sixth adjusted non-displayed page area on the display 160. The sixth adjusted non-displayed page area may include a portion (e.g., a 61st area 1361) of all the non-displayed page areas.

According to various embodiments of the present disclosure, if an additional event 1380 (e.g., a touch release event that occurs after the first touch event 1309) occurs, the electronic device 100 may perform a function based on an occurrence point of the additional event 1380. For example, as shown in a state 1307, the electronic device 100 may output, to a full screen of the display 160, a page area (e.g., a 31st area 1331 and a 32nd area 1332) corresponding to the occurrence point of the additional event 1380. The occurrence point of the additional event 1380 may correspond to the third non-displayed page area 1393. When the additional event 1380 occurs, the electronic device 100 may output, to the full screen of the display 160, the 31st area 1331 and the 32nd area 1332 included in the third non-displayed page area 1393. According to various embodiments of the present disclosure, if the additional event 1380 occurs on the fifth adjusted non-displayed page area 1395a, the electronic device 100 may output, to the display 160, areas included in the fifth non-displayed page area 1395a. For example, the electronic device 100 may output the 51st area 1351 and the 52nd area 1352 to the full screen of the display 160.

Figure 14:
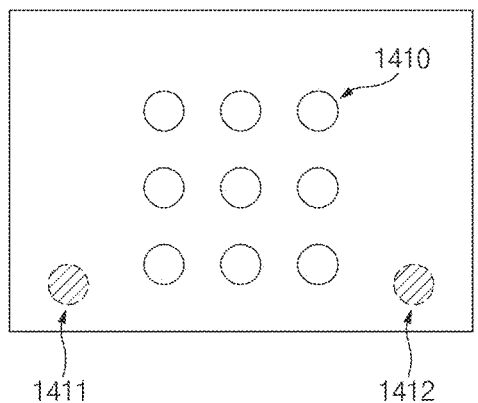
FIG. 14 is a diagram illustrating an example of a lock operation function according to an embodiment of the present disclosure.
Figure 14:
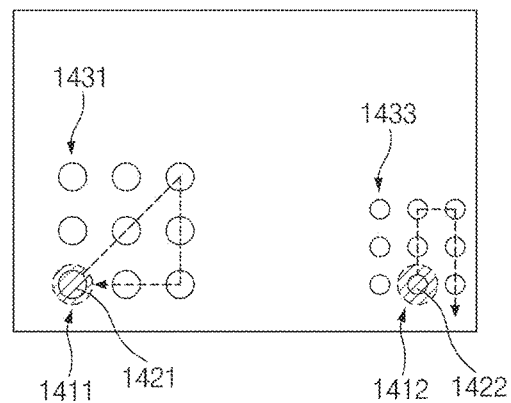

FIG. 14 is a diagram illustrating another example of a lock operation function according to an embodiment of the present disclosure.

Referring to FIG. 14, as shown in a state 1401, the electronic device 100 may output a first lock pattern 1410 to the display 160. For example, when the user holds the display 160 at two points, the electronic device 100 may receive a first touch event 1411 and a second touch event 1412 on the display 160.

According to an embodiment of the present disclosure, as shown in a state 1403, in FIG. 14, the electronic device 100 may output a second lock pattern 1431 based on an occurrence point of the first touch event 1411, and may output a third lock pattern 1433 based on an occurrence point of the second touch event 1412. Here, a release start point of the second lock pattern 1431 may be a lower left object 1421. Accordingly, the lower left object 1421 of the second lock pattern 1431 may be disposed on the occurrence point of the first touch event 1411, and the other objects of the second lock pattern 1431 may be rearranged based on the lower left object 1421. In this operation, the size of the objects may also be adjusted. A release start point of the third lock pattern 1433 may be a lower intermediate object 1422. Accordingly, the lower intermediate object 1422 of the third lock pattern 1433 may be disposed on the occurrence point of the second touch event 1412, and the other objects of the third lock pattern 1433 may be rearranged based on the lower intermediate object 1422. In this operation, additionally or alternatively, the size of the objects and/or the distances between the objects may be adjusted.

The electronic device 100 may determine whether an additional event that occurs based on the second lock pattern 1431 and an additional event that occurs based on the third lock pattern 1433 satisfy a specified condition. If the specified condition is satisfied, the electronic device 100 may perform a lock release. If the specified condition is not satisfied, the electronic device 100 may restore the state in which the first lock pattern 1410 is displayed as shown in the state 1401 in FIG. 14.

According to an embodiment of the present disclosure, a function of outputting a plurality of display-state-adjusted lock patterns may be performed according to a setting. If the setting is configured such that one lock pattern is output, the electronic device 100 may output only one lock pattern. In this operation, the electronic device 100 may output a lock pattern in relation to a touch event that occurred earlier (or later) among a plurality of touch events.

Figure 15:
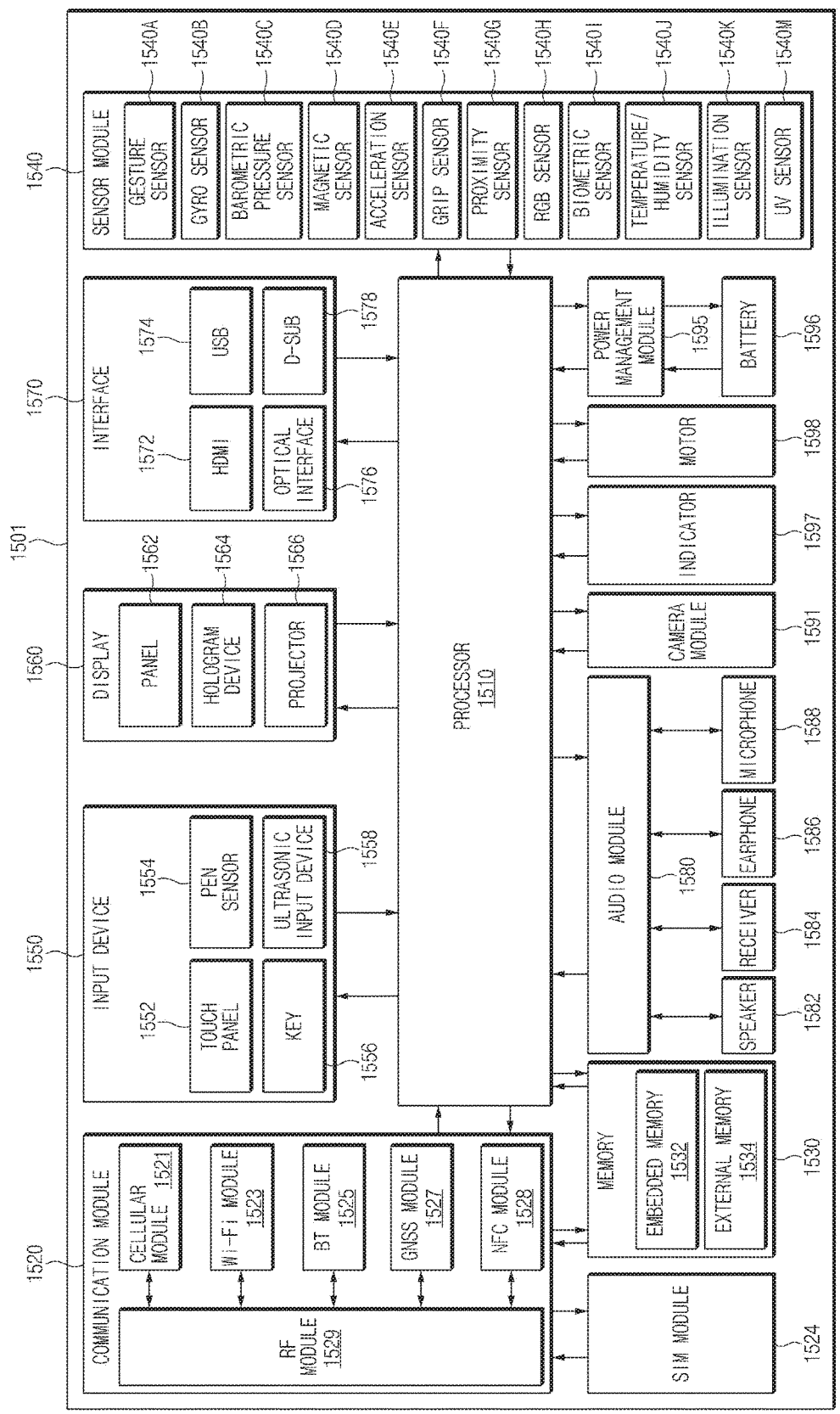
FIG. 15 is a block diagram illustrating an electronic device according to an embodiment of the present disclosure.

FIG. 15 is a block diagram illustrating an electronic device according to an embodiment of the present disclosure.

Referring to FIG. 15, an electronic device 1501 may include, for example, a part or the entirety of the electronic device described above with respect to the above-mentioned various embodiments of the present disclosure. The electronic device 1501 may include at least one processor (e.g., an AP) 1510, a communication module 1520, a subscriber identification module 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may run an OS or an application program so as to control a plurality of hardware or software elements connected to the processor 1510, and may process various data and perform operations. The processor 1510 may be implemented with, for example, a system on chip (SoC). According to an embodiment of the present disclosure, the processor 1510 may further include a graphic processing unit (GPU) and/or an image signal processor (ISP). The processor 1510 may include at least a portion (e.g., a cellular module 1521) of the elements illustrated in FIG. 15. The processor 1510 may load, on a volatile memory, an instruction or data received from at least one of other elements (e.g., a nonvolatile memory) to process the instruction or data, and may store various data in a nonvolatile memory.

The communication module 1520 may have a configuration that is the same as or similar to that of the communication interface 170 of FIG. 1. The communication module 1520 may include, for example, a cellular module 1521, a Wi-Fi module 1523, a Bluetooth module 1525, a GNSS module 1527 (e.g., a GPS module, a GLONASS module, a BeiDou module, or a Galileo module), a near field communication (NFC) module 1528, and a radio frequency (RF) module 1529.

The cellular module 1521 may provide, for example, a voice call service, a video call service, a text message service, or an Internet service through a communication network. According to an embodiment of the present disclosure, the cellular module 1521 may identify and authenticate the electronic device 1501 in the communication network using the subscriber identification module 1524 (e.g., a subscriber identification module (SIM) card). According to an embodiment of the present disclosure, the cellular module 1521 may perform at least a part of functions providable by the processor 1510. According to an embodiment of the present disclosure, the cellular module 1521 may include a communication processor (CP).

Each of the Wi-Fi module 1523, the Bluetooth module 1525, the GNSS module 1527, and the NFC module 1528 may include, for example, a processor for processing data transmitted/received through the modules. According to various embodiments of the present disclosure, at least a portion (e.g., at least two) of the cellular module 1521, the Wi-Fi module 1523, the Bluetooth module 1525, the GNSS module 1527, and the NFC module 1528 may be included in a single integrated chip (IC) or IC package.

The RF module 1529 may transmit/receive, for example, communication signals (e.g., RF signals). The RF module 1529 may include, for example, a transceiver, a power amp module (PAM), a frequency filter, a low noise amplifier (LNA), an antenna, or the like. According to another embodiment of the present disclosure, at least one of the cellular module 1521, the Wi-Fi module 1523, the Bluetooth module 1525, the GNSS module 1527, or the NFC module 1528 may transmit/receive RF signals through a separate RF module.

The subscriber identification module 1524 may include, for example, an embedded SIM and/or a card containing a subscriber identity module, and may include unique identification information (e.g., an integrated circuit card identifier (ICCID)) or subscriber information (e.g., international mobile subscriber identity (IMSI)).

Referring to FIG. 15, the memory 1530 (e.g., the memory 130 in FIG. 1) may include an internal (or embedded) memory 1532 or an external memory 1534. The internal memory 1532 may include at least one of a volatile memory (e.g., a dynamic random access memory (DRAM), a static RAM (SRAM), a synchronous dynamic RAM (SDRAM), or the like) or a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 1534 may include a flash drive, for example, compact flash (CF), secure digital (SD), micro-SD, mini-SD, extreme digital (xD), multi-media card (MMC), a memory stick, or the like. The external memory 1534 may be operatively and/or physically connected to the electronic device 1501 through various interfaces.

The sensor module 1540 may, for example, measure physical quantity or detect an operation state of the electronic device 1501 so as to convert measured or detected information into an electrical signal. The sensor module 1540 may include, for example, at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color (RGB) sensor 1540H (e.g., a red/green/blue (RGB) sensor), a biometric sensor 1540I, a temperature/humidity sensor 1540J, an illumination sensor 1540K, or an ultraviolet (UV) sensor 1540M. Additionally or alternatively, the sensor module 1540 may include, for example, additional sensors (not shown), such as an olfactory sensor (E-nose sensor), an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one sensor included therein. In various embodiments of the present disclosure, the electronic device 1501 may further include a processor configured to control the sensor module 1540 as a part of the processor 1510 or separately, so that the sensor module 1540 is controlled while the processor 1510 is in a sleep state.

The input device 1550 may include, for example, a touch panel 1552, a (digital) pen sensor 1554, a key 1556, or an ultrasonic input device 1558. The touch panel 1552 may employ at least one of capacitive, resistive, infrared, and ultraviolet sensing methods. The touch panel 1552 may further include a control circuit. The touch panel 1552 may further include a tactile layer so as to provide a haptic feedback to a user.

The (digital) pen sensor (or digital pen or stylus) 1554 may include, for example, a sheet for recognition which is a part of a touch panel or is separate. The key 1556 may include, for example, a physical button, an optical button, or a keypad. The ultrasonic input device 1558 may sense ultrasonic waves generated by an input tool through a microphone (e.g., a microphone 1588) so as to identify data corresponding to the ultrasonic waves sensed.

The display 1560 (e.g., the display 160) may include a panel 1562, a hologram device 1564, or a projector 1566. The panel 1562 may have a configuration that is the same as or similar to that of the display 160 of FIG. 2. The panel 1562 may be, for example, flexible, transparent, or wearable. The panel 1562 and the touch panel 1552 may be integrated into a single module. The hologram device 1564 may display a stereoscopic image in a space using a light interference phenomenon. The projector 1566 may project light onto a screen so as to display an image. The screen may be disposed in the inside or the outside of the electronic device 1501. According to an embodiment of the present disclosure, the display 1560 may further include a control circuit for controlling the panel 1562, the hologram device 1564, or the projector 1566.

The interface 1570 may include, for example, a high-definition multimedia interface (HDMI) 1572, a universal serial bus (USB) 1574, an optical interface 1576, or a D-subminiature (D-sub) 1578. The interface 1570, for example, may be included in the communication interface 170 illustrated in FIG. 1. Additionally or alternatively, the interface 1570 may include, for example, a mobile high-definition link (MHL) interface, SD card/MMC interface, or an infrared data association (IrDA) interface.

The audio module 1580 may convert, for example, a sound into an electrical signal or vice versa. At least a portion of elements of the audio module 1580 may be included in the input/output interface 150 illustrated in FIG. 1. The audio module 1580 may process sound information input or output through a speaker 1582, a receiver 1584, an earphone 1586, or the microphone 1588.

According to an embodiment of the present disclosure, the camera module 1591 for shooting a still image or a video may include, for example, at least one image sensor (e.g., a front sensor or a rear sensor), a lens, an ISP, or a flash (e.g., an LED or a xenon lamp).

The power management module 1595, as illustrated in FIG. 15, may manage power of the electronic device 1501. According to an embodiment of the present disclosure, the power management module 1595 may include a power management integrated circuit (PMIC), a charger integrated circuit (IC), or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a part thereof (e.g., the processor 1510), such as a booting state, a message state, a charging state, or the like. The motor 1598 may convert an electrical signal into a mechanical vibration, and may generate a vibration or haptic effect. Although not illustrated, a processing device (e.g., a GPU) for supporting a mobile TV may be included in the electronic device 1501. The processing device for supporting a mobile TV may process media data according to the standards of digital multimedia broadcasting (DMB), digital video broadcasting (DVB), Media-FLO™, or the like.

Figure 16:
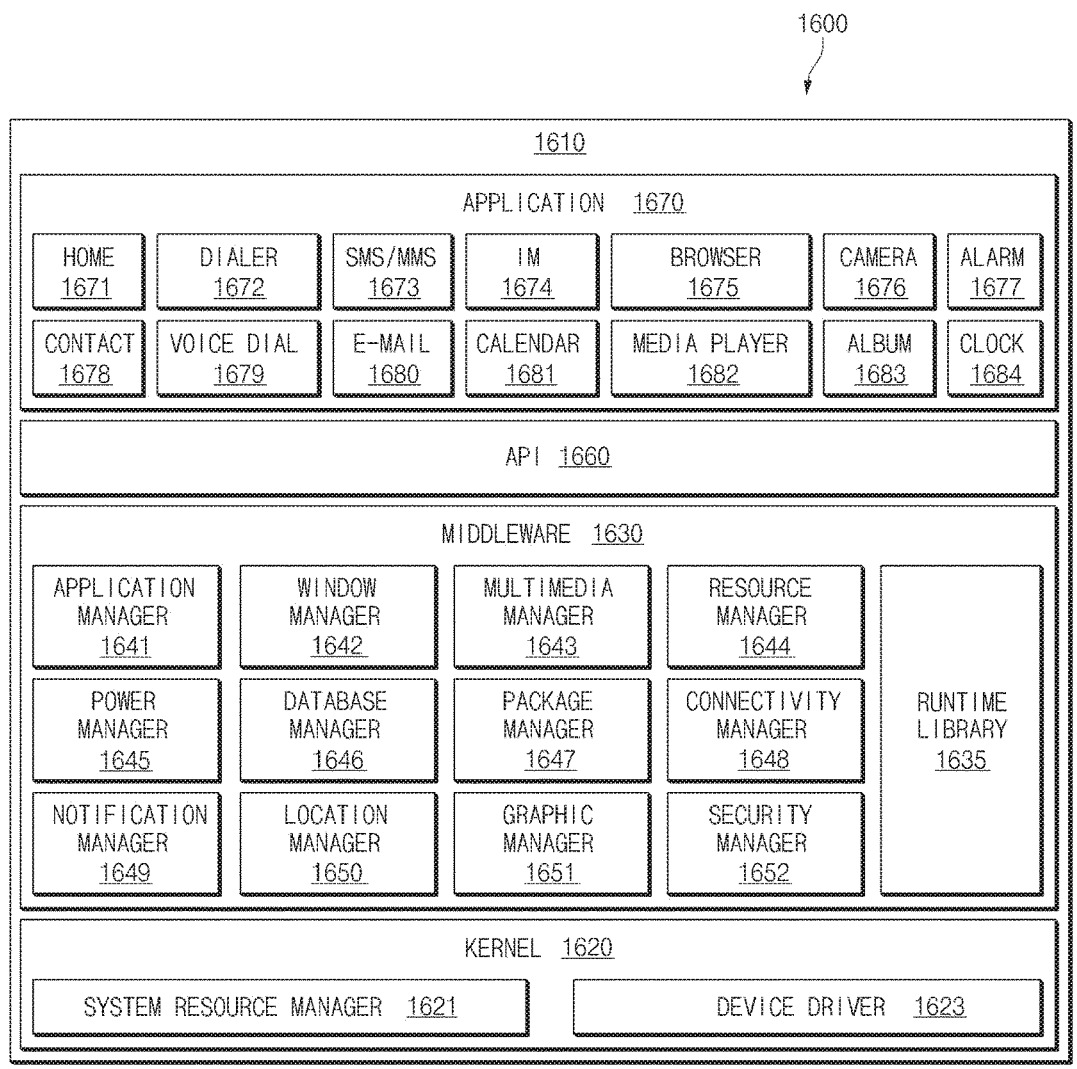
FIG. 16 is a diagram illustrating a program block according to an embodiment of the present disclosure.

FIG. 16 is a diagram illustrating a program block 1600 according to an embodiment of the present disclosure.

Referring to FIG. 16, a program module 1610 (e.g., the program 140 in FIG. 1) according to various embodiments of the present disclosure may include an operating system (OS) for controlling a resource related to an electronic device (e.g., the electronic device 100) and/or various applications (e.g., the application program 167) running on the OS. The OS may be, for example, Android™, iOS™, Windows™, Symbian™, Tizen™, Bada™, or the like.

The program module 1610 may include a kernel 1620, a middleware 1630, an API 1660, and/or an application 1670. At least a part of the program module 1610 may be pre-loaded on the electronic device or may be downloaded from the server 102.

The kernel 1620 (e.g., a kernel 161) may include, for example, a system resource manager 1621 and/or a device driver 1623. The system resource manager 1631 may perform control, allocation, or retrieval of a system resource. According to an embodiment of the present disclosure, the system resource manager 1631 may include a process management unit, a memory management unit, a file system management unit, or the like. The device driver 1633 may include, for example, a display driver, a camera driver, a Bluetooth driver, a shared memory driver, a USB driver, a keypad driver, a Wi-Fi driver, an audio driver, or an inter-process communication (IPC) driver.

The middleware 1630, as illustrated in FIG. 16, for example, may provide a function that the applications 1670 require in common, or may provide various functions to the applications 1670 through the API 1660 so that the applications 1670 may efficiently use limited system resources in the electronic device. According to an embodiment of the present disclosure, the middleware 1630 (e.g., the middleware 165) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, a security manager 1652.

The runtime library 1635 may include, for example, a library module that a complier uses to add a new function through a programming language while the application 1670 is running. The runtime library 1635 may perform a function for input/output management, memory management, or an arithmetic function.

The application manager 1641 may mange, for example, a life cycle of at least one of the applications 1670. The window manager 1642 may manage a GUI resource used in a screen. The multimedia manager 1643 may recognize a format required for playing various media files and may encode or decode a media file using a codec matched to the format. The resource manager 1644 may manage a resource such as a source code, a memory, or a storage space of at least one of the applications 1670.

The power manager 1645, as illustrated in FIG. 16, for example, may operate together with a basic input/output system (BIOS) to manage a battery or power and may provide power information required for operating the electronic device. The database manager 1646 may generate, search, or modify a database to be used in at least one of the applications 1670. The package manager 1644 may manage installation or update of an application distributed in a package file format.

The connectivity manger 1648 may manage wireless connection of Wi-Fi, Bluetooth, or the like. The notification manager 1649 may display or notify an event such as message arrival, appointments, and proximity alerts in such a manner as not to disturb a user. The location manager 1650 may manage location information of the electronic device. The graphic manager 1651 may manage a graphic effect to be provided to a user or a user interface related thereto. The security manager 1652 may provide various security functions required for system security or user authentication. According to an embodiment of the present disclosure, in the case in which an electronic device (e.g., the electronic device 100) includes a phone function, the middleware 1630 may further include a telephony manager for managing a voice or video call function of the electronic device.

The middleware 1630 may include a middleware module for forming a combination of various functions of the above-mentioned elements. The middleware 1630 may provide a module specialized for each type of an OS to provide differentiated functions. Furthermore, the middleware 1630 may delete a part of existing elements or may add new elements dynamically.

Referring to FIG. 16, the API 1660 (e.g., an API 145 in FIG. 1) which is, for example, a set of API programming functions, may be provided in different configurations according to an OS. For example, in the case of Android™ or iOS™, one API set may be provided for each platform, and, in the case of Tizen™, at least two API sets may be provided for each platform.

The application 1670 (e.g., the application program 147), as illustrated in FIG. 16, for example, may include at least one application for performing functions such as a home 1671, a dialer 1672, an SMS/MMS 1673, an instant message (IM) 1674, a browser 1675, a camera 1676, an alarm 1677, a contact 1678, a voice dial 1679, an e-mail 1680, a calendar 1681, a media player 1682, an album 1683, a clock 1684, health care (not shown) (e.g., measure an exercise amount or blood sugar), or environmental information provision (not shown) (e.g., provide air pressure, humidity, or temperature information).

According to an embodiment of the present disclosure, the application 1670 may include an application (hereinafter referred to as an "information exchange application") for supporting information exchange between the electronic device (e.g., the electronic device 100) and the server 102. The information exchange application may include, for example, a notification relay application for relaying specific information to an external device or a device management application for managing an external electronic device or an external device.

For example, the notification relay application may have a function for relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external device itself (or some elements) or the brightness (or resolution) adjustment of a display) of the external device 104 communicating with the electronic device, an application running in the external device, or a service (e.g., a call service or a message service) provided from the external device.

According to an embodiment of the present disclosure, the application 1670, illustrated in FIG. 16, may include a specified application (e.g., a healthcare application of a mobile medical device) according to an attribute of the external electronic device 104. According to an embodiment of the present disclosure, the application 1670 may include an application received from the server 102 or the external electronic device 104. According to an embodiment of the present disclosure, the application 1670 may include a preloaded application or a third-party application downloadable from a server. The names of the elements of the program module 1610 illustrated may vary with the type of an OS.

According to various embodiments of the present disclosure, at least a part of the program module 1610 may be implemented with software, firmware, hardware, or a combination thereof. At least a part of the program module 1610, for example, may be implemented (e.g., executed) by a processor (e.g., the processor 120). At least a part of the program module 1610 may include, for example, a module, a program, a routine, sets of instructions, or a process for performing at least one function.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one software module for performing operations of various embodiments of the present disclosure and vice versa.

According to various embodiments of the present disclosure, one or more objects included in a screen or at least a part of a screen that may be output by a corresponding application is/are temporarily reduced and displayed based on a user input point, thereby facilitating the selection and checking of the object(s).

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added. The above embodiments of the present disclosure are illustrative and not limitative. Various alternatives and equivalents are possible. Other additions, subtractions, or modifications are obvious in view of the present disclosure and are intended to fall within the scope of the appended claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display on which a plurality of objects is displayed;
   at least one processor operatively connected to the display; and
   a memory electrically connected to the at least one processor,
   wherein the memory is configured to store instructions that, when executed, cause the at least one processor to:
   display a lock pattern including the plurality of objects being arranged in an arrangement and spaced apart by a first interval,
   receive an input event,
   determine a location based on an initial touch indicated by the input event, the location of the initial touch corresponding to one of the plurality of objects that matches a start point of a lock release pattern of the lock pattern,
   select a second interval to apply to the plurality of objects based on the determined location, and
   display the lock pattern including the plurality of objects being arranged in the arrangement and spaced apart by the second interval by moving the plurality of objects displayed on the display by a specified distance towards the indicated location of the initial touch and adjust intervals between the plurality of objects displayed on the display from the first interval to the second interval while maintaining the arrangement, and
   wherein the one of the plurality of objects that matches the start point of the lock release pattern of the lock pattern, at the location of the initial touch, remains stationary while other objects of the plurality of objects move towards the one of the plurality of objects that matches the start point of the lock release pattern.

2. The electronic device of claim 1, wherein the instructions, when executed, cause the at least one processor to adjust a size of the plurality of objects.

3. The electronic device of claim 1, wherein the instructions, when executed, cause the at least one processor to display an additional object related to an execution of a specified function in response to an occurrence of the input event.

4. The electronic device of claim 3, wherein the instructions, when executed, cause the at least one processor to perform a function mapped to the additional object if the additional object overlaps the plurality of objects due to an additional input event.

5. The electronic device of claim 1, wherein the instructions, when executed, cause the at least one processor to:
   reduce a size of the lock pattern.

6. The electronic device of claim 5, wherein the instructions, when executed, cause the at least one processor to:
   release a lock function if an additional input event satisfies a specified condition, or
   restore an initial lock pattern display state prior to the reduction in the size of the lock pattern if the additional input event does not satisfy the specified condition.

7. The electronic device of claim 1, wherein the instructions, when executed, cause the at least one processor to, if an entirety of the lock pattern having a specified size is unable to be displayed based on the location, reduce a size of the lock pattern by a ratio such that an entirety of the lock pattern is displayed.

8. A method for operating a screen, the method comprising:
   displaying, by one or more processors, a lock pattern including a plurality of objects on a display, the plurality of objects being arranged in an arrangement and spaced apart by a first interval;
   receiving, by the one or more processors, an input event;
   determining, by the one or more processors, a location based on an initial touch indicated by the input event, the location of the initial touch corresponding to one of the plurality of objects that matches a start point of a lock release pattern of the lock pattern;
   selecting, by the one or more processors, a second interval to apply to the plurality of objects based on the determined location;
   displaying, by the one or more processors, the lock pattern including the plurality of objects being arranged in the arrangement and spaced apart by the second interval by move moving at least one object among the plurality of objects displayed on the display by a specified distance towards the determined location; and adjusting, by the one or more processors, intervals between the plurality of objects by adjusting an interval between the plurality of objects displayed on the display based on the location of the initial touch from the first interval to the second interval while maintaining the arrangement, wherein the one of the plurality of objects that matches the start point of the lock release pattern of the lock pattern, at the location of the initial touch, remains stationary while other objects of the plurality of objects move towards the one of the plurality of objects that matches the start point of the lock release pattern.

9. The method of claim 8, wherein the displaying of the plurality of objects comprises adjusting a size of the plurality of objects.

10. The method of claim 8, further comprising displaying an additional object related to an execution of a specified function.

11. The method of claim 10, further comprising:
receiving an additional input event; and
performing a function mapped to the additional object if the additional object overlaps the plurality of objects due to the additional input event.

12. The method of claim 8, further comprising:
receiving an additional input event; and
performing one of:
releasing a lock function if the additional input event satisfies a specified condition, or
restoring an initial lock pattern display state if the additional input event does not satisfy the specified condition.

13. The method of claim 8, wherein the displaying of the lock pattern including the plurality of objects being arranged in the arrangement and spaced apart by the second interval comprises reducing the lock pattern by such a ratio that an entirety of the lock pattern is displayed if the entirety of the lock pattern is unable to be displayed when the lock pattern is displayed based on the location.

* * * * *